US012562861B2

(12) United States Patent
Gong et al.

(10) Patent No.: US 12,562,861 B2
(45) Date of Patent: Feb. 24, 2026

(54) COMMUNICATION METHOD AND APPARATUS

(71) Applicant: HUAWEI TECHNOLOGIES CO., LTD., Shenzhen (CN)

(72) Inventors: Mingxin Gong, Beijing (CN); Di Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 230 days.

(21) Appl. No.: 18/352,903

(22) Filed: Jul. 14, 2023

(65) Prior Publication Data

US 2024/0048310 A1    Feb. 8, 2024

Related U.S. Application Data

(63) Continuation of application No. PCT/CN2021/072324, filed on Jan. 15, 2021.

(51) Int. Cl.
 *H04L 5/00*            (2006.01)
(52) U.S. Cl.
 CPC .......... *H04L 5/0048* (2013.01); *H04L 5/0012* (2013.01); *H04L 5/0094* (2013.01)
(58) Field of Classification Search
 None
 See application file for complete search history.

(56) References Cited

U.S. PATENT DOCUMENTS

2016/0277065 A1 * 9/2016 Xie ...................... H04B 1/7143
2020/0213161 A1 * 7/2020 Zhang ................... H04W 80/08

2022/0304019 A1 * 9/2022 Takahashi ............. H04L 5/0012
2023/0239088 A1 * 7/2023 Gao ...................... H04L 5/0051
                                                                 370/329

(Continued)

FOREIGN PATENT DOCUMENTS

EP        3010156 A1      4/2016
EP        3675404 A1      7/2020

OTHER PUBLICATIONS

Vivo, "Discussion on SRS enhancement," 3GPP TSG RAN WG1#103-e, R1-2007649, e-Meeting, Oct. 26-Nov. 13, 2020, Total 21 pages, 3rd Generation Partnership Project, Valbonne, France (Nov. 1, 2020).

(Continued)

*Primary Examiner* — Benjamin Lamont
(74) *Attorney, Agent, or Firm* — Leydig, Voit & Mayer, Ltd.

(57)                ABSTRACT

A communication method and apparatus are provided. The method includes: a terminal device receives first information, and sends an SRS based on the first information. The first information indicates an SRS frequency domain resource. The SRS frequency domain resource includes a first frequency domain unit and a second frequency domain unit. The first frequency domain unit is different from the second frequency domain unit. The first frequency domain unit is a frequency domain resource occupied by the SRS on a first frequency hopping subband in a first frequency hopping period. The second frequency domain unit is a frequency domain resource occupied by the SRS on the first frequency hopping subband in a second frequency hopping period. The first frequency hopping subband is one of a plurality of frequency hopping subbands.

20 Claims, 13 Drawing Sheets

(56) References Cited

U.S. PATENT DOCUMENTS

| | | | | |
|---|---|---|---|---|
| 2023/0246792 | A1* | 8/2023 | Wang | H04L 5/0094 |
| | | | | 370/329 |
| 2023/0344590 | A1* | 10/2023 | Manolakos | H04W 72/232 |

OTHER PUBLICATIONS

ZTE, "Enhancements on SRS flexibility, coverage and capacity," 3GPP TSG RAN WG1#103-e, e-Meeting, Oct. 26-Nov. 13, 2020, R1-2007768, Total 13 pages, 3rd Generation Partnership Project, Valbonne, France (Nov. 1, 2020).
"3rd Generation Partnership Project; Technical Specification Group Radio Access Network; NR; Physical channels and modulation (Release 16)," 3GPP TS 38.211 V16.3.0, Total 133 pages (Sep. 2020).

* cited by examiner

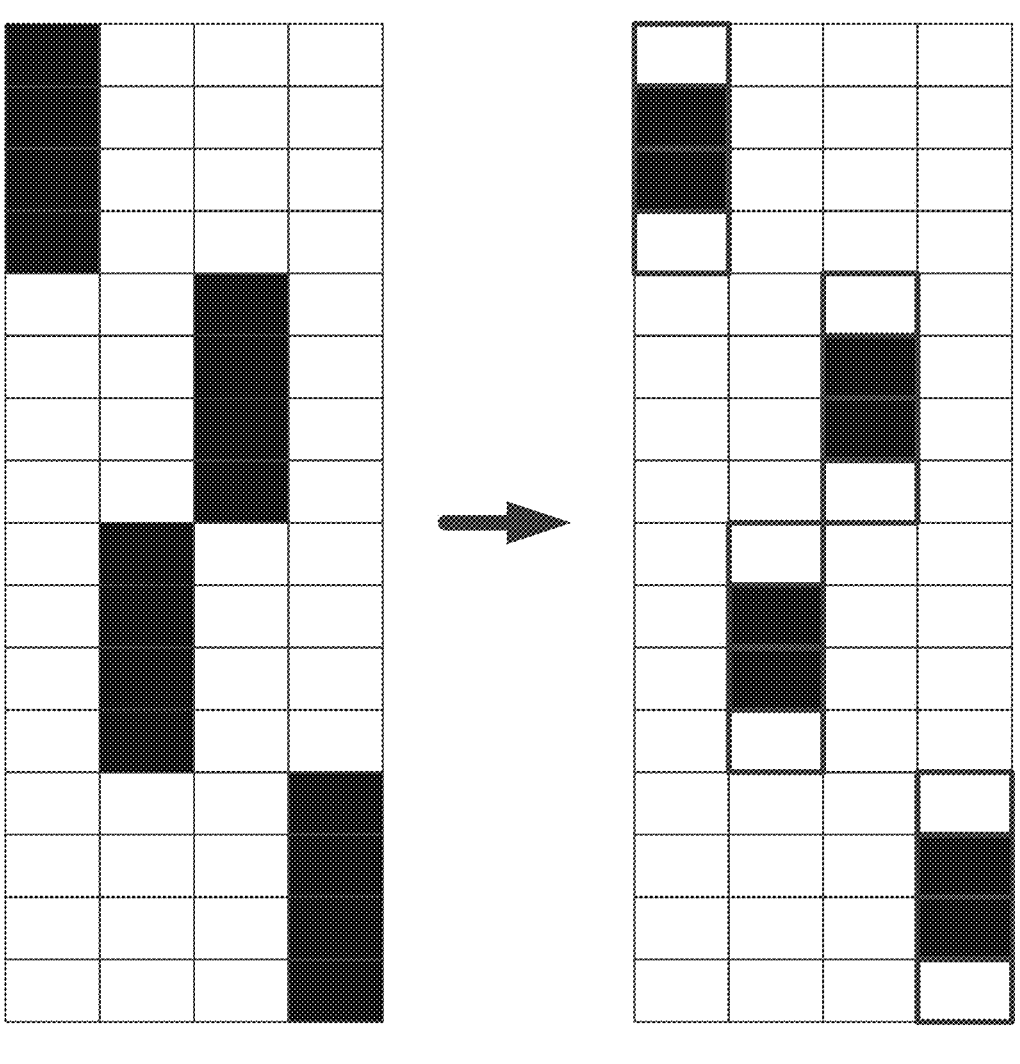
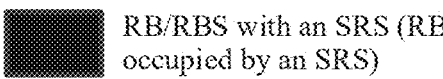
RB/RBS with an SRS (RB occupied by an SRS)
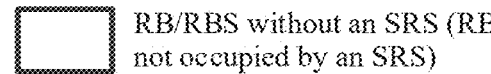
RB/RBS without an SRS (RB not occupied by an SRS)
FIG. 2
PRIOR ART

100

120                 110

200

210                 220

230

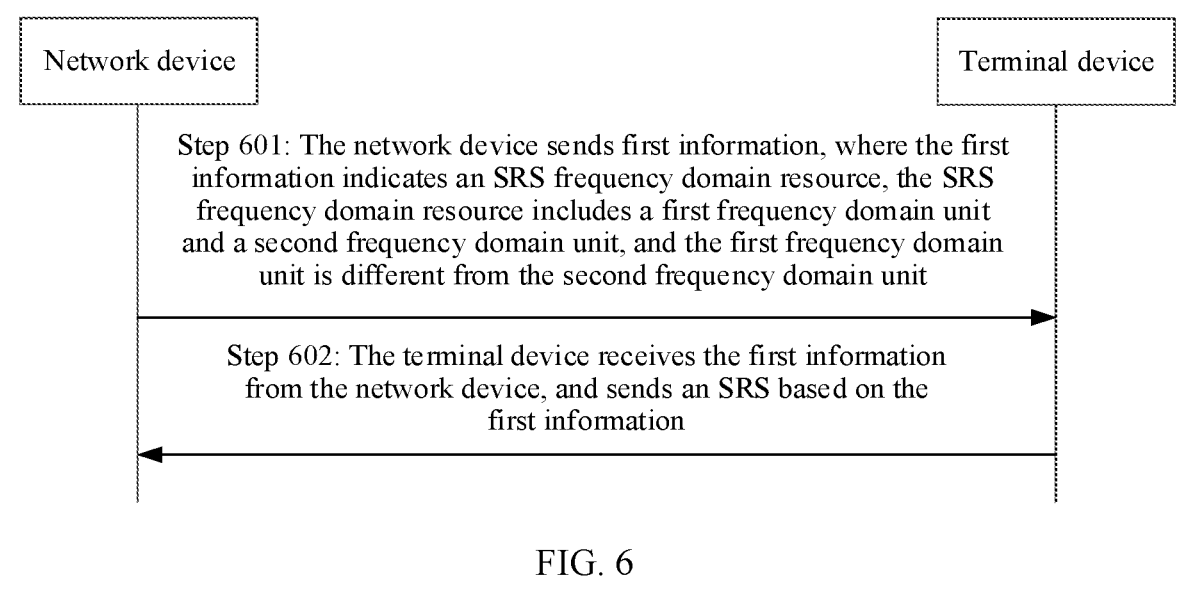

Network device

Terminal device

Step 601: The network device sends first information, where the first information indicates an SRS frequency domain resource, the SRS frequency domain resource includes a first frequency domain unit and a second frequency domain unit, and the first frequency domain unit is different from the second frequency domain unit Step 602: The terminal device receives the first information from the network device, and sends an SRS based on the first information

FIG. 6

COMMUNICATION METHOD AND APPARATUS

CROSS-REFERENCE TO RELATED APPLICATIONS

This application is a continuation of International Application No. PCT/CN2021/072324, filed on Jan. 15, 2021, the disclosure of which is hereby incorporated by reference in its entirety.

TECHNICAL FIELD

Embodiments of this application relate to the field of wireless communication, and in particular, to a communication method and apparatus.

BACKGROUND

In a communication system, a reference signal (RS) may also be referred to as a "pilot" signal, and is a known signal that is provided by a transmit end to a receive end and that is for channel estimation or channel sounding. Reference signals are classified into an uplink reference signal and a downlink reference signal.

The uplink reference signal is a signal sent by a terminal device to a network device. In other words, the transmit end is the terminal device, and the receive end is the network device. The uplink reference signal is used for uplink channel estimation (used by the network device to perform coherent demodulation and detection or used for calculating precoding) and uplink channel quality measurement. The uplink reference signal may include a demodulation reference signal (DMRS) and a sounding reference signal (SRS). The SRS may be used for uplink channel quality estimation and channel selection, for calculating a signal-to-interference-plus-noise ratio (SINR) of an uplink channel, and for obtaining an uplink channel coefficient. In a time division duplex (TDD) scenario, uplink and downlink channels have reciprocity, and the SRS may also be used to obtain a downlink channel coefficient.

As shown in FIG. 1, when a bandwidth that needs to be measured is large, user equipment (UE) needs to send the SRS in a frequency hopping manner. The UE sends the SRS on a plurality of time domain symbols, and a bandwidth occupied by each symbol of the SRS covers a part of an entire configured bandwidth. For example, the UE may send the SRS on four time domain symbols in the frequency hopping manner, and a bandwidth occupied by each symbol of the SRS is a quarter of the entire configured bandwidth.

However, as a system bandwidth increases, a quantity of resource blocks corresponding to the system bandwidth increases exponentially. Therefore, when the bandwidth occupied by each symbol of the SRS is large, a received power spectrum density is low. Specifically, if transmit power is fixed, the transmit power is evenly allocated to a broader bandwidth. Consequently, lower power is allocated to each resource element (RE), a channel estimation result may be affected, and system performance deteriorates. When the bandwidth occupied by each symbol of the SRS is small, a quantity of measurement times required for completing a round of system bandwidth measurement is large, and measurement time is also long. As a result, efficiency of channel quality measurement of the system is reduced.

In addition, the network device may further configure the UE to send the SRS on a bandwidth part. As shown in FIG.

2, the UE sends the SRS on a fixed bandwidth part in a bandwidth of each symbol. In this way, no SRS is sent on another bandwidth part, and a channel of the bandwidth part can be obtained only through interpolation or a filtering algorithm. Consequently, channel estimation of a bandwidth part without SRS sending may be inaccurate, and performance of the bandwidth part is poor.

SUMMARY

Embodiments of this application provide a communication method and apparatus, to resolve inaccurate channel estimation of a bandwidth part without SRS sending, and poor performance of the bandwidth part caused by inaccurate channel estimation.

According to a first aspect, an embodiment of this application provides a communication method. The method includes.

A terminal device receives first information, and sends an SRS based on the first information. The first information indicates an SRS frequency domain resource. The SRS frequency domain resource includes a first frequency domain unit and a second frequency domain unit. The first frequency domain unit is different from the second frequency domain unit. The first frequency domain unit is a frequency domain resource occupied by the SRS on a first frequency hopping subband in a first frequency hopping period. The second frequency domain unit is a frequency domain resource occupied by the SRS on the first frequency hopping subband in a second frequency hopping period. The first frequency hopping subband is one of a plurality of frequency hopping subbands.

According to the method, in comparison with the conventional technology in which channel estimation of the bandwidth part without SRS sending may be inaccurate, because the first frequency domain unit is different from the second frequency domain unit, the SRS can be flexibly sent, and it can be ensured that channel estimation performance on each bandwidth part is average, to improve system performance.

In a possible design, the first frequency domain unit is less than a frequency domain resource occupied by the first frequency hopping subband.

In a possible design, the first frequency domain unit and the second frequency domain unit are one RB, or the first frequency domain unit and the second frequency domain unit are a plurality of consecutive RBs.

In a possible design, the SRS frequency domain resource includes a third frequency domain unit. The third frequency domain unit is a frequency domain resource occupied by the SRS on a second frequency hopping subband in the first frequency hopping period. The second frequency hopping subband is a frequency hopping subband that is in the plurality of frequency hopping subbands and that is different from the first frequency hopping subband. A frequency domain offset of a starting position of the first frequency domain unit relative to a starting position of the first frequency hopping subband is the same as a frequency domain offset of a starting position of the third frequency domain unit relative to a starting position of the second frequency hopping subband.

In a possible design, the frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units. A frequency domain width occupied by the N frequency domain units is less than a bandwidth of the first frequency hopping subband. N is a positive integer.

According to the method, a frequency-domain starting position of the SRS vanes with time by using one frequency domain unit as a granularity.

In a possible design, the first frequency hopping subband includes a frequency domain unit 1, a frequency domain unit 2, a frequency domain unit 3, and a frequency domain unit 4 in a frequency domain sequence. In four consecutive frequency hopping periods, an SRS frequency domain resource occupation manner on the first frequency hopping subband is any one of the following: The four consecutive frequency hopping periods successively occupy the frequency domain unit 1, the frequency domain unit 3, the frequency domain unit 2, and the frequency domain unit 4; the four consecutive frequency hopping periods successively occupy the frequency domain unit 2, the frequency domain unit 4, the frequency domain unit 1, and the frequency domain unit 3; the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

According to the method, frequency domain resources occupied by four SRS transmissions in each frequency hopping subband are evenly distributed in the frequency hopping subband.

In a possible design, the first frequency hopping subband includes a frequency domain unit 1, a frequency domain unit 2, a frequency domain unit 3, and a frequency domain unit 4 in a frequency domain sequence. In two consecutive frequency hopping periods, an SRS frequency domain resource occupation manner on the first frequency hopping subband is any one of the following: The two consecutive frequency hopping periods successively occupy the frequency domain unit 1 and the frequency domain unit 2, and the frequency domain unit 3 and the frequency domain unit 4; and the two consecutive frequency hopping periods successively occupy the frequency domain unit 3 and the frequency domain unit 4, and the frequency domain unit 1 and the frequency domain unit 2.

According to the method, frequency domain resources occupied by two SRS transmissions in each frequency hopping subband are evenly distributed in the frequency hopping subband.

In a possible design, the first information indicates an SRS frequency domain resource occupation manner.

In a possible design, the sending the SRS based on the first information includes: sending the SRS in a frequency hopping manner on the plurality of frequency hopping subbands.

According to a second aspect, an embodiment of this application provides a communication method. The method includes:

A network device sends first information to a terminal device; and receives an SRS from the terminal device based on the first information. The first information indicates an SRS frequency domain resource. The SRS frequency domain resource includes a first frequency domain unit and a second frequency domain unit. The first frequency domain unit is different from the second frequency domain unit. The first frequency domain unit is a frequency domain resource occupied by the SRS on a first frequency hopping subband in a first frequency hopping period. The second frequency domain unit is a frequency domain resource occupied by the SRS on the first frequency hopping subband in a second frequency hopping period. The first frequency hopping subband is one of a plurality of frequency hopping subbands.

In a possible design, the first frequency domain unit is less than a frequency domain resource occupied by the first frequency hopping subband.

In a possible design, the first frequency domain unit and the second frequency domain unit are one RB, or the first frequency domain unit and the second frequency domain unit are a plurality of consecutive RBs.

In a possible design, the SRS frequency domain resource includes a third frequency domain unit. The third frequency domain unit is a frequency domain resource occupied by the SRS on a second frequency hopping subband in the first frequency hopping period. The second frequency hopping subband is a frequency hopping subband that is in the plurality of frequency hopping subbands and that is different from the first frequency hopping subband. A frequency domain offset of a starting position of the first frequency domain unit relative to a starting position of the first frequency hopping subband is the same as a frequency domain offset of a starting position of the third frequency domain unit relative to a starting position of the second frequency hopping subband.

In a possible design, the frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units. A frequency domain width occupied by the N frequency domain units is less than a bandwidth of the first frequency hopping subband. N is a positive integer.

In a possible design, the first frequency hopping subband includes a frequency domain unit 1, a frequency domain unit 2, a frequency domain unit 3, and a frequency domain unit 4 in a frequency domain sequence. In four consecutive frequency hopping periods, an SRS frequency domain resource occupation manner on the first frequency hopping subband is any one of the following: The four consecutive frequency hopping periods successively occupy the frequency domain unit 1, the frequency domain unit 3, the frequency domain unit 2, and the frequency domain unit 4; the four consecutive frequency hopping periods successively occupy the frequency domain unit 2, the frequency domain unit 4, the frequency domain unit 1, and the frequency domain unit 3; the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

In a possible design, the first frequency hopping subband includes a frequency domain unit 1, a frequency domain unit 2, a frequency domain unit 3, and a frequency domain unit 4 in the frequency domain sequence. In two consecutive frequency hopping periods, an SRS frequency domain resource occupation manner on the first frequency hopping subband is any one of the following: The two consecutive frequency hopping periods successively occupy the frequency domain unit 1 and the frequency domain unit 2, and the frequency domain unit 3 and the frequency domain unit 4; and the two consecutive frequency hopping periods successively occupy the frequency domain unit 3 and the frequency domain unit 4, and the frequency domain unit 1 and the frequency domain unit 2.

In a possible design, the first information indicates an SRS frequency domain resource occupation manner.

According to a third aspect, an embodiment of this application provides a communication apparatus. The apparatus includes a processing unit and a transceiver unit.

The processing unit invokes the transceiver unit to receive first information; and send an SRS based on the first information. The first information indicates an SRS frequency domain resource. The SRS frequency domain resource includes a first frequency domain unit and a second frequency domain unit. The first frequency domain unit is different from the second frequency domain unit. The first frequency domain unit is a frequency domain resource occupied by the SRS on a first frequency hopping subband in a first frequency hopping period. The second frequency domain unit is a frequency domain resource occupied by the SRS on the first frequency hopping subband in a second frequency hopping period. The first frequency hopping subband is one of a plurality of frequency hopping subbands.

In a possible design, the first frequency domain unit is less than a frequency domain resource occupied by the first frequency hopping subband.

In a possible design, the first frequency domain unit and the second frequency domain unit are one RB, or the first frequency domain unit and the second frequency domain unit are a plurality of consecutive RBs.

In a possible design, the SRS frequency domain resource includes a third frequency domain unit. The third frequency domain unit is a frequency domain resource occupied by the SRS on a second frequency hopping subband in the first frequency hopping period. The second frequency hopping subband is a frequency hopping subband that is in the plurality of frequency hopping subbands and that is different from the first frequency hopping subband. A frequency domain offset of a starting position of the first frequency domain unit relative to a starting position of the first frequency hopping subband is the same as a frequency domain offset of a starting position of the third frequency domain unit relative to a starting position of the second frequency hopping subband.

In a possible design, the frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units. A frequency domain width occupied by the N frequency domain units is less than a bandwidth of the first frequency hopping subband. N is a positive integer.

In a possible design, the first frequency hopping subband includes a frequency domain unit 1, a frequency domain unit 2, a frequency domain unit 3, and a frequency domain unit 4 in a frequency domain sequence. In four consecutive frequency hopping periods, an SRS frequency domain resource occupation manner on the first frequency hopping subband is any one of the following: The four consecutive frequency hopping periods successively occupy the frequency domain unit 1, the frequency domain unit 3, the frequency domain unit 2, and the frequency domain unit 4; the four consecutive frequency hopping periods successively occupy the frequency domain unit 2, the frequency domain unit 4, the frequency domain unit 1, and the frequency domain unit 3; the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

In a possible design, the first frequency hopping subband includes the frequency domain unit 1, the frequency domain unit 2, the frequency domain unit 3, and the frequency domain unit 4 in the frequency domain sequence.

In two consecutive frequency hopping periods, an SRS frequency domain resource occupation manner on the first frequency hopping subband is any one of the following: The two consecutive frequency hopping periods successively occupy the frequency domain unit 1 and the frequency domain unit 2, and the frequency domain unit 3 and the frequency domain unit 4; and the two consecutive frequency hopping periods successively occupy the frequency domain unit 3 and the frequency domain unit 4, and the frequency domain unit 1 and the frequency domain unit 2.

In a possible design, the first information indicates an SRS frequency domain resource occupation manner.

In a possible design, the processing unit invokes the transceiver unit to send the SRS in a frequency hopping manner on the plurality of frequency hopping subbands.

According to a fourth aspect, an embodiment of this application provides a communication apparatus. The apparatus includes a processing unit and a transceiver unit.

The processing unit invokes the transceiver unit to: send first information to a terminal device, where the first information indicates an SRS frequency domain resource, the SRS frequency domain resource includes a first frequency domain unit and a second frequency domain unit, the first frequency domain unit is different from the second frequency domain unit, the first frequency domain unit is a frequency domain resource occupied by an SRS on a first frequency hopping subband in a first frequency hopping period, the second frequency domain unit is a frequency domain resource occupied by the SRS on the first frequency hopping subband in a second frequency hopping period, and the first frequency hopping subband is one of a plurality of frequency hopping subbands; and receive the SRS from the terminal device based on the first information.

In a possible design, the first frequency domain unit is less than a frequency domain resource occupied by the first frequency hopping subband.

In a possible design, the first frequency domain unit and the second frequency domain unit are one resource block RB, or the first frequency domain unit and the second frequency domain unit are a plurality of consecutive RBs.

In a possible design, the SRS frequency domain resource includes a third frequency domain unit. The third frequency domain unit is a frequency domain resource occupied by the SRS on a second frequency hopping subband in the first frequency hopping period. The second frequency hopping subband is a frequency hopping subband that is in the plurality of frequency hopping subbands and that is different from the first frequency hopping subband. A frequency domain offset of a starting position of the first frequency domain unit relative to a starting position of the first frequency hopping subband is the same as a frequency domain offset of a starting position of the third frequency domain unit relative to a starting position of the second frequency hopping subband.

In a possible design, the frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units. A frequency domain width occupied by the N frequency domain units is less than a bandwidth of the first frequency hopping subband. N is a positive integer.

In a possible design, the first frequency hopping subband includes a frequency domain unit 1, a frequency domain unit 2, a frequency domain unit 3, and a frequency domain unit 4 in a frequency domain sequence. In four consecutive frequency hopping periods, an SRS frequency domain resource occupation manner on the first frequency hopping subband is any one of the following: The four consecutive frequency hopping periods successively occupy the frequency domain unit 1, the frequency domain unit 3, the frequency domain unit 2, and the frequency domain unit 4; the four consecutive frequency hopping periods successively occupy the frequency domain unit 2, the frequency domain unit 4, the frequency domain unit 1, and the frequency domain unit 3; the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

In a possible design, the first frequency hopping subband includes the frequency domain unit 1, the frequency domain unit 2, the frequency domain unit 3, and the frequency domain unit 4 in the frequency domain sequence. In two consecutive frequency hopping periods, an SRS frequency domain resource occupation manner on the first frequency hopping subband is any one of the following: The two consecutive frequency hopping periods successively occupy the frequency domain unit 1 and the frequency domain unit 2, and the frequency domain unit 3 and the frequency domain unit 4; and the two consecutive frequency hopping periods successively occupy the frequency domain unit 3 and the frequency domain unit 4, and the frequency domain unit 1 and the frequency domain unit 2.

In a possible design, the first information indicates an SRS frequency domain resource occupation manner.

According to a fifth aspect, an embodiment of this application provides a communication apparatus. The apparatus includes a module configured to implement any possible design in the first aspect or a module configured to implement any possible design in the second aspect.

According to a sixth aspect, a communication apparatus is provided, and includes a processor. The processor is coupled to a memory, and may be configured to execute instructions in the memory, to implement any possible design in the first aspect or any possible design in the second aspect. Optionally, the communication apparatus further includes a communication interface. The processor is coupled to the communication interface. The communication interface is configured to input and/or output information. The information includes at least one of the instructions and data. Optionally, the communication apparatus further includes the memory.

In an implementation, the communication apparatus is a terminal device or a network device. When the communication apparatus is the terminal device or the network device, the communication interface may be a transceiver or an input/output interface. Optionally, the transceiver may be a transceiver circuit. Optionally, the input/output interface may be an input/output circuit.

In another implementation, the communication apparatus is a chip or a chip system configured in a terminal device or a network device. When the communication apparatus is the chip or the chip system configured in the terminal device, the communication interface may be an input/output interface, an interface circuit, an output circuit, an input circuit, a pin, a related circuit, or the like. The processor may alternatively be a processing circuit or a logic circuit.

According to a seventh aspect, an embodiment of this application provides a communication apparatus, including a processor and an interface circuit. The interface circuit is configured to input and/or output information. The information includes at least one of instructions and data. The interface circuit is configured to: receive a signal from another communication apparatus other than the communication apparatus and send the signal to the processor, or send a signal from the processor to another communication apparatus other than the communication apparatus. The processor is configured to implement any possible design in the first aspect or any possible design in the second aspect by using a logic circuit or by executing code instructions.

According to a sixth aspect, an embodiment of this application provides a computer-readable storage medium. The storage medium stores a computer program or instructions, and when the computer program or the instructions is/are executed by a communication apparatus, any possible design in the first aspect or any possible design in the second aspect is implemented.

According to a seventh aspect, an embodiment of this application provides a computer program product including a program. When the program is run on a communication apparatus, the communication apparatus is enabled to execute any possible design in the first aspect or any possible design in the second aspect.

BRIEF DESCRIPTION OF DRAWINGS

FIG. 2 is a schematic diagram 2 in which a terminal device sends an SRS in a frequency hopping manner according to an embodiment of this application;

FIG. 6 is an overview flowchart of a communication method according to an embodiment of this application;

DESCRIPTION OF EMBODIMENTS

The following further describes embodiments of this application in detail with reference to accompanying drawings.

Technical solutions in embodiments of this application may be applied to various communication systems, for example, a global system of mobile communications (GSM), a code division multiple access (CDMA) system, a wideband code division multiple access WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) mobile communication system, new radio (NR), or the like. The 5G mobile communication system in this application includes a non-standalone (NSA) 5G mobile communication system and/or standalone (SA) 5G mobile communication system. The technical solutions provided in embodiments of this application can also be applied to a future communication system, for example, a 6th generation mobile communication system. The communication system may alternatively be a public land mobile network (PLMN), a device-to-device (D2D) network, a machine-to-machine (M2M) network, an Internet of things (IoT) network, or another network.

Figure 3A:
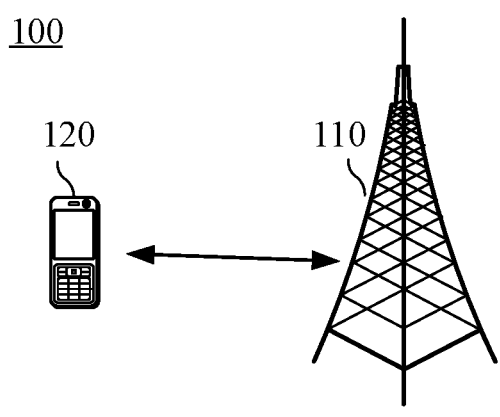
FIG. 3(a) is a schematic diagram of a communication system 100 according to an embodiment of this application.
Figure 3B:
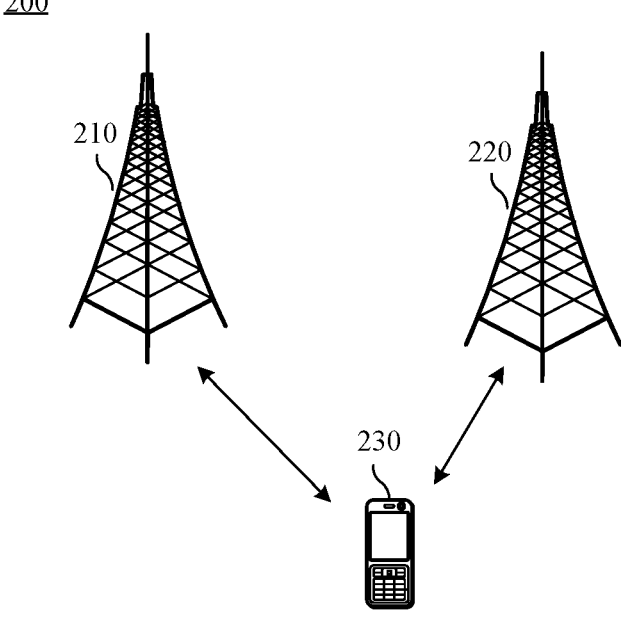
FIG. 3(b) is a schematic diagram of a communication system 200 according to an embodiment of this application.

FIG. 3(*a*) is a schematic diagram of a possible communication system 100 applied to an embodiment of this application. The communication system 100 is in a single-carrier scenario or a carrier aggregation (CA) scenario. The communication system 100 includes a network device 110 and a terminal device 120. The network device 110 communicates with the terminal device 120 by using a wireless network.

It should be understood that the network device 110 in FIG. 3(*a*) may include one or more cells. When a transmission direction of the communication system 100 is uplink transmission, the terminal device 120 is a transmit end, and the network device 110 is a receive end. When the transmission direction of the communication system 100 is downlink transmission, the network device 110 is a transmit end, and the terminal device 120 is a receive end.

FIG. 3(*b*) is a schematic diagram of another possible communication system 200 applied to an embodiment of this application. The communication system 200 is in a dual connectivity (DC) or coordinated multipoint transmission/reception (CoMP) scenario. The communication system 200 includes a network device 210, a network device 220, and a terminal device 230. The network device 210 is a network device used when the terminal device 230 performs initial access, and is responsible for radio resource control (RRC) communication with the terminal device 230. The network device 220 is added during RRC reconfiguration, and is configured to provide an additional radio resource. The terminal device 230 for which CA is configured is connected to the network device 210 and the network device 220. A link between the network device 210 and the terminal device 230 may be referred to as a first link. A link between the network device 220 and the terminal device 230 may be referred to as a second link.

Communication systems shown in FIG. 3(*a*) and FIG. 3(*b*) are merely examples for description. A communication system to which an embodiment of this application is applicable is not limited. For example, a quantity of network devices and a quantity of terminal devices included in the communication system may be other quantities, or a single base station scenario, a multi-carrier aggregation scenario, a dual connectivity scenario, a D2D communication scenario, or a CoMP scenario is used. The CoMP scenario may be one or more of a non-coherent joint transmission (NCJT) scenario, a coherent joint transmission (CJT) scenario, a joint transmission (JT) scenario, or the like.

Figure 4:
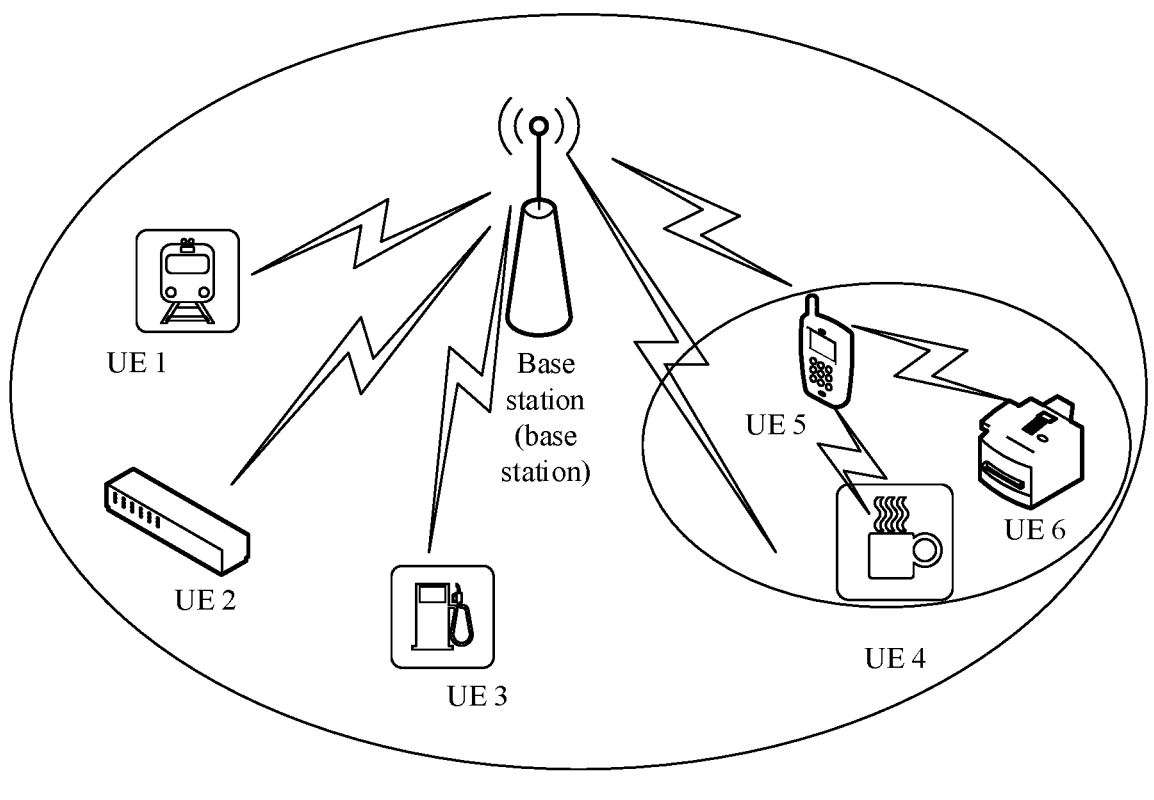
FIG. 4 is a schematic diagram of a network element according to an embodiment of this application.

As shown in FIG. 4, a network element in embodiments of this application includes a terminal device and a network device.

The terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved PLMN, or the like. This is not limited in embodiments of this application.

As an example rather than a limitation, the terminal device may alternatively be a wearable device in embodiments of this application. The wearable device may also be referred to as a wearable smart device, which is a generic term for wearable devices that are developed through intelligent design on daily wearables by using wearable technologies, such as glasses, gloves, watches, clothing, and shoes. The wearable device is a portable device that is worn directly on a body or integrated into clothing or accessories of a user. The wearable device is not merely a hardware device, but further implements a powerful function through software support, data exchange, and cloud-based interaction. In a broad sense, a wearable intelligent device includes a device that provides a complete function, has a large size, and can implement all or some functions without relying on a smartphone, for example, a smartwatch or smart glasses; and includes a device that focuses only on a specific type of application function and needs to be used in combination with another device such as a smartphone, for example, various smart bands, or smart jewelry for monitoring physical signs.

In addition, in embodiments of this application, the terminal device may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, the IoT technology may implement massive connections, deep coverage, and terminal power saving by using, for example, a narrow band (NB) technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

The network device in embodiments of this application may be a device configured to communicate with the terminal device. The network device may be a base transceiver station (BTS) in a global system for mobile communication (GSM) or code division multiple access (CDMA), a NodeB (NB) in a wideband code division multiple access (WCDMA) system, an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in embodiments of this application.

The network device in embodiments of this application may be a device, for example, a radio access network (RAN) node that connects a terminal to a wireless network, in the wireless network. Currently, the RAN node is, for example, a base station, a next generation NodeB gNB, a transmission reception point (TRP), an evolved NodeB (eNB), a home base station, a baseband unit (BBU), or an access point (AP) in a Wi-Fi system. In a network structure, the network device may include a central unit (CU) node, a distributed unit (DU) node, or a RAN device including a CU node and a DU node.

In embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). An operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. A term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), or a digital versatile disc (DVD)), or a smart card and a flash memory component (for example, an erasable programmable read-only memory (EPROM), a card, a stick, or a key drive). In addition, various storage media described in this specification may represent one or more devices and/or other machine-readable media that are configured to store information. A term "machine-readable media" may include but is not limited to a radio channel, and various other media that can store, contain and/or carry instructions and/or data.

In the following, some terms in this application are described, to help a person skilled in the art have a better understanding.

1. Physical Downlink Control Channel (PDCCH)

To improve efficiency of blindly detecting a control channel by the terminal device, a concept of control resource set is proposed in an NR standard formulation process. The network device may configure one or more resource sets for the terminal device, to send a PDCCH. The network device may send, to the terminal device, a control channel on any control resource set corresponding to the terminal device. In addition, the network device further needs to notify the terminal device of other configuration, for example, a search space set, associated with the control resource set. Control resource sets are different in configuration information, for example, a frequency domain width difference or a time domain length difference. It is extensible that the control resource set in this application may be a control resource set (CORESET), a control region, or an enhanced physical downlink control channel (ePDCCH) set that is defined in a 5G mobile communication system.

A time-frequency position occupied by the PDCCH may be referred to as a downlink control region.

In NR, the downlink control region may be flexibly configured by using RRC signaling based on the control resource set and the search space set.

The control resource set may be used to configure information such as a frequency domain position of the PDCCH or a control channel element (CCE) and a quantity of consecutive symbols in time domain. The search space set may be used to configure information such as a PDCCH detection period, an offset, and a start symbol in a slot.

For example, in the search space set, a PDCCH period may be configured as one slot, and a start symbol in time domain is a symbol 0. In this case, the terminal device may detect the PDCCH at a starting position of each slot.

The PDCCH is used to transmit downlink control information (DCI). Cyclic redundancy check (CRC) scrambling may be performed on the DCI with different content by using different radio network temporary identifiers (RNTI). The terminal device may know a function of a current PDCCH by blindly detecting the RNTI.

2. Antenna Port

The antenna port may also be referred to as a port. The antenna port corresponds to a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port.

3. Bandwidth Part (BWP)

The network device may configure one or more downlink/uplink bandwidth parts for the terminal device. The BWP may include consecutive physical resource blocks (PRB) in frequency domain. The BWP is one subset in a bandwidth of the terminal device. A minimum granularity of the BWP in frequency domain is one PRB. The system may configure one or more bandwidth parts for the terminal device, and a plurality of bandwidth parts may overlap in frequency domain.

In a single-carrier scenario, one terminal device can only have one active BWP at a same moment. The terminal device can only receive data/a reference signal or send data/a reference signal on the active BWP.

In this application, in a case applicable to a BWP scenario, a specific BWP may alternatively be a bandwidth set at a specific frequency, or a set including a plurality of resource blocks (RB).

4. Component Carrier (CC)

The component carrier may also be referred to as a component carrier, a component carrier, a member carrier, or the like. Each carrier in multi-carrier aggregation may be referred to as a "CC". The terminal device may receive data on a plurality of CCs. Each carrier includes one or more PRBs. Each carrier may have a corresponding PDCCH for scheduling a physical downlink shared channel (PDSCH) of each CC, or some carriers have no PDCCH, and in this case, cross-carrier scheduling may be performed on these carriers.

Cross-carrier scheduling: The network device sends a PDCCH on one CC to schedule data transmission on another CC, that is, transmits a PDSCH on the another CC, or transmits a physical uplink shared channel (PUSCH) on the another CC. More specifically, the network device may send a PDCCH in a BWP on one CC, to schedule transmission of the PDSCH or the PUSCH in a BWP on the another CC. In other words, a control channel is transmitted on one CC, and a corresponding data channel is transmitted on another CC.

It should be further understood that in embodiments of this application, the "carrier" may be understood as a "serving cell" or a "cell".

Optionally, the cell includes at least one of a downlink carrier, an uplink (UL) carrier, or a supplementary uplink (SUL) carrier. Specifically, the cell may include the downlink carrier and the uplink carrier; or the cell may include the downlink carrier and the supplementary uplink carrier; or the cell includes the downlink carrier, the uplink carrier, and the supplementary uplink carrier.

Optionally, a carrier frequency of the supplementary uplink carrier is lower than a carrier frequency of the uplink carrier, to improve uplink coverage.

Optionally, usually, in an FDD system, a carrier frequency of the uplink carrier is different from a carrier frequency of the downlink carrier. In a TDD system, the uplink carrier and the downlink carrier have a same carrier frequency.

It should be further understood that, in embodiments of this application, an uplink resource is on the uplink carrier, and a downlink resource is on the downlink carrier.

It should be further understood that, in embodiments of this application, the uplink carrier may be a normal uplink carrier, or may be the supplementary uplink (SUL) carrier.

5. Time Unit, Uplink Time Unit, Downlink Time Unit, and Flexible Time Unit

The time unit is, for example, but not limited to, a time window such as a system information (SI) window, including one or more radio frames, one or more subframes, one or more slots, one or more mini slots, one or more subslots, one or more symbols, or a plurality of frames or subframes.

A time length of one symbol is not limited. A length of one symbol may vary for different subcarrier spacings.

A time domain resource is, for example, but not limited to, one or more orthogonal frequency division multiplexing (OFDM) symbols. For example, a time domain resource occupied by a reference signal (RS) may be indicated by using a start symbol (or a starting position) and a quantity of symbols that are configured by the network device.

Symbols include an uplink symbol and a downlink symbol. The uplink symbol may be referred to as a single carrier frequency division multiple access (SC-FDMA) symbol or an OFDM symbol. The downlink symbol may be an OFDM symbol.

The communication system divides time units in time domain into at least one of the uplink time unit, the downlink time unit, or the flexible time unit based on uplink/downlink time unit configuration.

The uplink time unit is a time unit that is included in the time domain resource and that is used for uplink transmission. The downlink time unit is a time unit that is included in the time domain resource and that is used for downlink transmission.

The flexible time unit is a time unit that is included in a flexible transmission time domain resource. The flexible time unit can indicate, by using the RRC signaling, that the flexible transmission time domain resource is an uplink transmission time domain resource or a downlink transmission time domain resource; or dynamically indicate, based on a service requirement, that the flexible transmission time domain resource is an uplink transmission time domain resource or a downlink transmission time domain resource. For example, DCI signaling indicates that the flexible transmission time domain resource is the uplink transmission time domain resource or the downlink transmission time domain resource. It can be understood that, the flexible transmission time domain resource in the flexible time unit may further be used as a guard period, so that interference caused by uplink/downlink transmission switching is avoided by using a reserved guard period. It may be understood that a flexible transmission symbol may also be referred to as a flexible symbol in embodiments of this application. It may be further understood that the "flexible transmission time domain resource" can be replaced with the "flexible symbol" in embodiments of this application. For example, the flexible time unit is one slot, and one flexible transmission time domain resource is one symbol.

6. SRS

The SRS may be for uplink channel quality estimation and channel selection, for calculating an SINR of an uplink channel, and for obtaining an uplink channel coefficient. In a TDD scenario, uplink and downlink channels have reciprocity, and the SRS may also be used to obtain a downlink channel coefficient. The uplink/downlink channel coefficient estimated by the network device based on the SRS may be used to determine an uplink/downlink precoding matrix, to increase an uplink/downlink transmission rate and improve a system capacity.

The network device configures, by using higher layer signaling such as RRC signaling or media access control (Medium Access Control-Control Element, MAC-CE) signaling, a time-frequency resource position occupied by an SRS resource and a sending manner of sending the SRS on the SRS resource. Configuration information (for example, a higher layer parameter SRS resource) of each SRS resource includes at least an index number of the SRS resource, information about the time-frequency position occupied by the SRS resource, an SRS sending port number, and the like, and may be specifically determined by using configuration parameters in Table 1. A minimum sounding bandwidth of the SRS resource supported by the NR is four PRBs. In addition, there is an integer multiple relationship between frequency hopping bandwidths of different SRS resources, and a frequency hopping pattern has a tree structure.

TABLE 1

SRS resource configuration parameters

| Name of SRS resource configuration parameters | Meaning |
|---|---|
| srs-ResourceId | SRS resource identifier |
| nrofSRS-Ports | Quantity of SRS ports |
| SRS-resource Type | Time domain type of SRS resource configuration |
| periodicityAndOffset-p or periodicityAndOffset-sp | Slot-level period and slot-level offset |
| resourceMapping | Quantity of OFDM symbols occupied by an SRS resource, and a start symbol and a repetition factor in one slot |
| freqDomainPosition | Frequency-domain position, which is configured by using four PRBs as a granularity |
| freqHopping | SRS bandwidth, frequency hopping bandwidth, and frequency hopping manner configuration |
| transmissionComb | Transmission comb |
| cyclicShift | Cyclic shift |
| spatialRelationInfo | Spatial filtering relationship between a target SRS and a reference signal |

A time domain type of the SRS resource configuration may be periodic, semi-persistent, or aperiodic. Configuration information of a periodic SRS resource includes a period (for example, 2 ms, 5 ms, or 10 ms) and an offset parameter. After the network device configures the SRS resource by using the RRC signaling, the terminal device sends the SRS on a determined SRS resource based on the configuration information in a slot of a specific period. Configuration information of an aperiodic SRS resource does not include a period or an offset parameter, but includes only one time domain offset parameter K indicating a spacing between the SRS and the DCI signaling that triggers the SRS. When the terminal device receives the DCI signaling at an n moment, and the signaling indicates to trigger the SRS, the terminal device sends the SRS on a corresponding SRS resource at an $(n+K)^{th}$ moment, where K and n are positive integers.

A frequency hopping manner can be supported for SRS transmission. A specific frequency hopping feature may be determined by both time-domain and frequency-domain parameters.

A process of determining a time domain position of the SRS is specifically as follows:

For example, in time domain, the SRS occupies $N_S$ (nrofSymbols) symbols (for example, 1, 2, or 4) in the slot. A repetition parameter (repetitionFactor, R)$\in\{1, 2, 4\}$, and meets R$\leq N_S$, that is, the SRS is repeatedly transmitted in each symbol for R times.

Based on the repetitionFactor, it can be learned that:

if R=$N_S$, an intra-slot frequency hopping manner is not supported for the SRS transmission;

if R=1 and $N_S$=2 or 4, an intra-slot frequency hopping manner is supported for the SRS transmission, and intra-slot frequency hopping is performed by using one OFDM symbol as a unit; or if R=2 and $N_S$=4, an intra-slot frequency hopping manner is supported for the SRS transmission, and intra-slot frequency hopping is performed by using a pair of OFDM symbols (namely, two OFDM symbols) as a unit.

For a periodic SRS and a semi-persistent SRS, a corresponding period and corresponding time domain offset parameters need to be configured. The periodic SRS and the semi-persistent SRS can be transmitted in the intra-slot frequency hopping manner, or can be transmitted in an inter-slot (based on an SRS period) frequency hopping manner. An aperiodic SRS only supports the intra-slot frequency hopping (that is, frequency hopping can be finished after the SRS is triggered for one time).

A process of determining a frequency domain position of the SRS is specifically as follows:

For example, the network device configures the SRS resource for the terminal device by using the RRC signaling. The RRC signaling indicates information such as a quantity of ports included in the SRS resource, the frequency domain position and the time domain position that are occupied by the SRS resource, a use period, a comb, a cyclic shift value, and a sequence ID. The frequency domain position of the SRS resource is determined by a group of frequency domain parameters (in the existing 3GPP protocol, the frequency domain parameters include $n_{RRC}$, $n_{shift}$, $B_{SRS}$, $C_{SRS}$, and $b_{hop}$) in the RRC signaling. The terminal device can determine, based on these frequency domain parameters and a protocol-predefined rule, a bandwidth occupied by the SRS and a frequency-domain starting position.

$C_{SRS}$ is an index number of cell-specific SRS bandwidth configuration. $B_{SRS}$ is an index number of user-specific SRS bandwidth configuration. $b_{hop}$ indicates whether to perform SRS frequency hopping (or indicates the frequency hopping bandwidth). $n_{shift}$ indicates an offset value that can be used for the SRS transmission from a low frequency of an uplink system bandwidth (or indicates a frequency-domain starting position of an SRS frequency hopping bandwidth). $n_{RRC}$ indicates an index of a frequency-domain starting position of a user SRS (or indicates a frequency-domain starting position of an SRS frequency hopping subband).

The frequency-domain starting position of the SRS is determined by the terminal device based on $n_{RRC}$ and $n_{shift}$ configured by the network device for the terminal device.

SRS configured bandwidth (which is also referred to as the frequency hopping bandwidth): The terminal device determines, based on parameters $b_{hop}$ and $C_{SRS}$ that are configured by the network device for the terminal device, and Table 3, a quantity $m_{SRS,b'}$ of RBs occupied by an entire SRS, where b'=$b_{h}$op. For example, it is assumed that $b_{hop}$=0 and $C_{SRS}$=9, it may be determined that $m_{SRS,b'}$=32 by searching Table 3.

Bandwidth (which is or referred to as a bandwidth occupied by a frequency hopping subband) occupied by each symbol of the SRS: The terminal device determines, based on parameters $B_{SRS}$ and $C_{SRS}$ that are configured by the network device for the terminal device, and Table 3, a quantity $m_{SRS,b}$ of RBs occupied by the SRS on each symbol. where b=$B_{SRS}$. For example, it is assumed that $B_{SRS}$=2 and $C_{SRS}$=9, $m_{SRS,b}$=8 can be determined by searching Table 3.

When $b_{hop} \geq B_{SRS}$. the terminal device does not enable the frequency hopping manner. In other words, the terminal device sends the SRS in a non-frequency hopping manner. It should be understood that, when the non-frequency hopping manner is used, an SRS sent by a terminal for one time covers an entire configured bandwidth of an SRS resource.

When $b_{hop} < B_{SRS}$, the terminal device enables the frequency hopping manner. In other words, the terminal device sends the SRS in the frequency hopping manner. It should be understood that, when the SRS is sent in the frequency hopping manner, the SRS sent by the terminal device each time covers only a part (namely, one frequency hopping subband) of the configured bandwidth of the SRS resource, and the terminal sends the SRS for a plurality of times in one frequency hopping period to cover the entire configured bandwidth of the SRS resource.

An SRS sending manner in the current standard is as follows:

(1) If $b_{hop} \ge B_{SRS}$ (no frequency hopping), a value of a frequency position index $$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}, \text{where}$$

$$F_b(n_{SRS}) = \begin{cases} (N_b/2)\left\lfloor \dfrac{n_{SRS} \bmod \prod_{b'=b_{hop}}^{b} N_{b'}}{\prod_{b'=b_{hop}}^{b} N_{b'}} \right\rfloor + \left\lfloor \dfrac{n_{SRS} \bmod \prod_{b'=b_{hop}}^{b} N_{b'}}{2\prod_{b'=b_{hop}}^{b} N_{b'}} \right\rfloor & \text{if } N_b \text{ even } (N_b \text{ is an even number}) \\ \lfloor N_b/2 \rfloor \left\lfloor n_{SRS}/\prod_{b'=b_{hop}}^{b} N_{b'} \right\rfloor & \text{if } N_b \text{ odd } ((N_b \text{ is an odd number})) \end{cases}$$

$n_{SRS}$ is a specific quantity of SRS transmissions of the terminal device (an SRS counter of the terminal device).

$$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor$$

TABLE 2

| Symbol | Meaning | Value |
|---|---|---|
| $N_{slot}^{frame,\,\mu}$ | Quantity of slots in one system frame | 20 |
| $n_f$ | System frame number (a system frame number of a current SRS transmission) | — |
| $n_{s,f}^{\mu}$ | Slot number in one system frame | — |
| $N_{symb}^{SRS}$ | Quantity of symbols in one resource (resource) | 1, 2, 4 |
| $T_{SRS}$ | User SRS period (slot) | 1, 2, 4, 5, . . . , 2560 |
| $T_{offset}$ | User SRS slot offset | — |
| l' | Symbol number | 0 to $N_{symb}^{SRS} - 1$ |
| R | Repetition factor of an SRS sending symbol | 1, 2, 4 |

Figure 1:
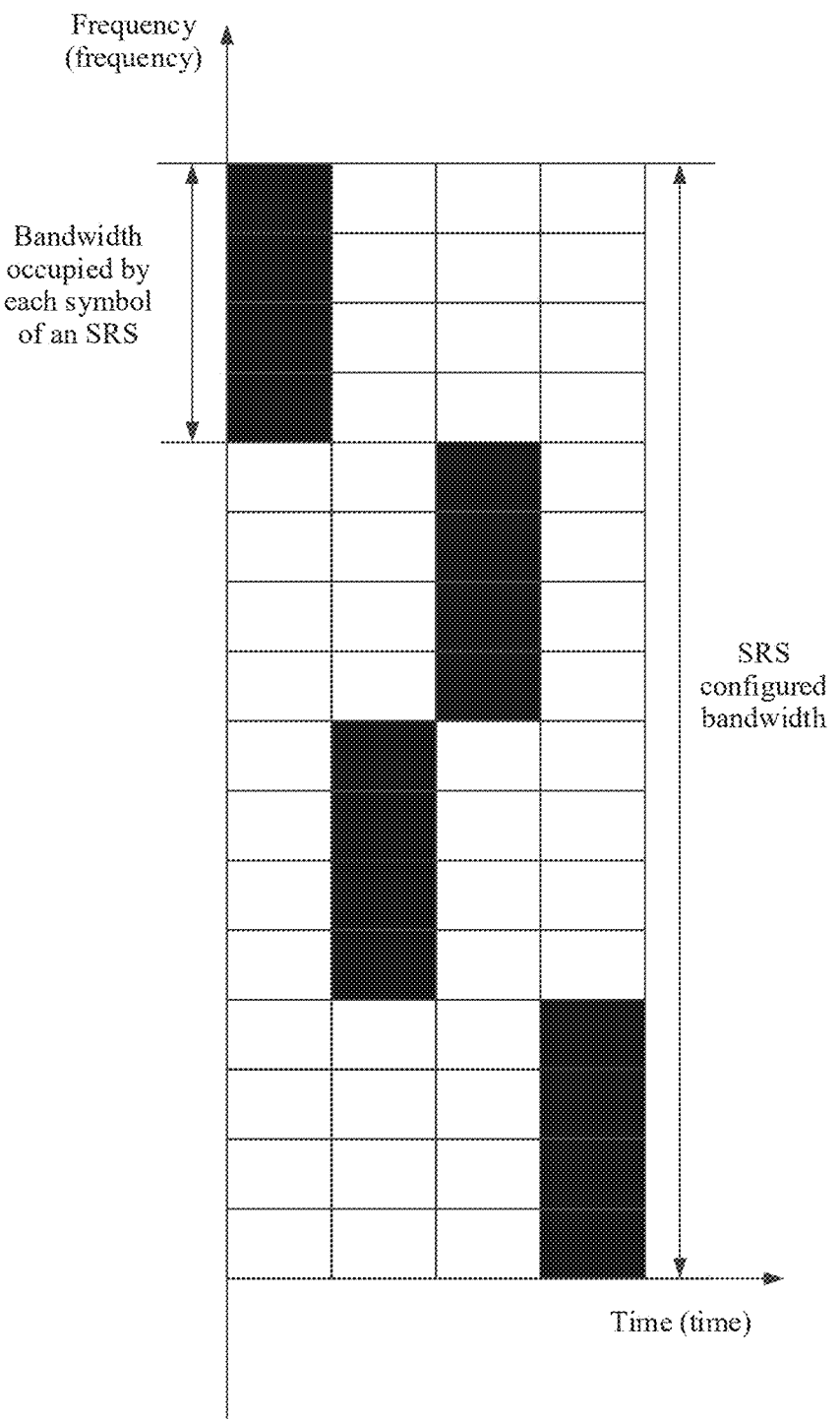
FIG. 1 is a schematic diagram 1 in which a terminal device sends an SRS in a frequency hopping manner according to an embodiment of this application.

It should be noted that FIG. 1 is used as an example for description. In FIG. 1, one block indicates four RBs in frequency domain. Therefore, the configured bandwidth of the SRS resource includes 48 RBs, and the SRS occupies 12 RBs on one time domain symbol. Therefore, the terminal device can send the SRS on four time domain symbols in the frequency hopping manner, and a bandwidth of each time domain symbol is a quarter of the entire configured bandwidth. In FIG. 1, one small black block indicates four RBs carrying the SRS. It should be noted that the four time domain symbols in FIG. 1 may be four consecutive time domain symbols or four non-consecutive time domain symbols. This is not limited in this embodiment of this application. The frequency hopping manner shown in FIG. 1 is merely used to describe an SRS frequency domain resource occupation manner, and does not limit an SRS time domain resource occupation manner.

In this embodiment of this application, a quantity of frequency hopping times in one frequency hopping period is equal to a quantity of times that the terminal device needs to send the SRS in one frequency hopping period. For example, a quantity of frequency hopping times in FIG. 1 is 4.

Optionally, the quantity of frequency hopping times is equal to $\Pi_{b=b_{hop}+1}^{S_{SRS}} N_b$. $N_b$ is determined based on $C_{SRS}$ and Table 3.

For example, if $b_{hop}=0$, $C_{SRS}=9$, and $B_{SRS}=2$, the quantity of frequency hopping times is equal to $2 \times 2=4$.

TABLE 3

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,\,0}$ | $N_0$ | $m_{SRS,\,1}$ | $N_1$ | $m_{SRS,\,2}$ | $N_2$ | $m_{SRS,\,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |

19

TABLE 3-continued

| | $B_{SRS}=0$ | | $B_{SRS}=1$ | | $B_{SRS}=2$ | | $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

For another example, it is assumed that a system bandwidth is 20 MHz.

(1) A cell SRS bandwidth is configured as $C_{SRS}=18$, a user SRS bandwidth configuration selects $B_{SRS}=3$, and a quantity of RBs allocated to each layer is respectively $m_{SRS,b}=72$, 24,12,4 (b=0, 1, 2, 3).

(2) The user SRS selects full-band frequency hopping ($b_{hop}=0$).

(3) A UE starting position is configured as $n_{RRC}=15$ (0~17), and a user occupies an even subcarrier, that is, $k_{TC}=0$ (2comb)($k_{TC}$ indicates an offset of a subcarrier, separately indicates an offset of a subcarrier occupied by the user SRS, and is used to determine a to-be-used comb tooth).

(1-1) A quantity $N_b$ of branches of an upper-level node at a b layer is equal to 1, 3, 2, or 3 (b=0,1, 2, 3).

(1-2) Values of $\Pi_{b'=b_{hop}}^{b-1} N_{b'}$ are respectively 1, 3, and 6 ($N_0$, $N_0 N_1$, and $N_0 N_1 N_2$). and are respectively denoted as $P_0$, $P_1$, and $P_2$.

(1-3) It is assumed that an initial UE SRS counter $n_{SRS}=0$.

(2-1) When b=0, $N_b=1$, $m_{SRS,b}=72$, and $b \leq b_{hop}=0$, a frequency position index $n_b=\lfloor 4n_{RRC}/m_{SRS,b}\rfloor$ mod $N_b=0$.

(2-2) When b=1, $N_b=3$, $m_{SRS,b}=24$, and $b \geq b_{hop}$, $n_b=\{F_b(n_{SRS})+\lceil 4n_{RRC}/m_{SRS,b}\rceil\}$ mod $N_b=2$.

Note: $P_0=\Pi_{b'=b_{hop}}^{b-1} N_b=1$, $F_b(n_{SRS})=\lceil N_b/\Pi n_{SRS}/\Pi_{b'=b_{hop}}^{b-1} N_b\rfloor=\lfloor n_{SRS}/P_0\rfloor=0$, and $\lceil 4n_{RRC}/m_{SRS,b}\rceil=2$.

(2-3) When b=2, $N_b=2$, $m_{SRS,b}=12$, and $b>b_{hop}$, $n_b=\{F_b(n_{SRS})+\lceil 4n_{RRC}/m_{SRS,b}\rceil\}$mod $N_b=1$.

Note:

$$P_1 = \prod\nolimits_{b'=b_{ho}}^{b} N_{b'} = 3,$$

$$F_b(n_{SRS}) = (N_b/2)\left\lfloor \frac{n_{SRS} \bmod \prod_{b'=b_{hop}}^{b} N_{b'}}{\prod_{b'=b_{hop}}^{b} N_{b'}} \right\rfloor + \left\lfloor \frac{n_{SRS} \bmod \prod_{b'=b_{hop}}^{b} N_{b'}}{2\prod_{b'=b_{hop}}^{b} N_{b'}} \right\rfloor =$$

$$(N_b/2)\left\lfloor \frac{n_{SRS} \bmod P_1}{P_1} \right\rfloor + \left\lfloor \frac{n_{SRS} \bmod P_1}{2P_1} \right\rfloor = 0, \text{ and } \lfloor 4n_{RRC}/m_{SRS,b}\rfloor = 5.$$

(2-4) When b=3, $N_b=3$, $m_{SRS,b}=4$, and $b>b_{hop}$, $n_b=\{F_b(n_{SRS})+\lceil 4n_{RRC}/m_{SRS,b}\rceil\}$ mod $N_b=0$.

20

Note: $P_2=\Pi_{b'=b_{hop}}^{b-1} N_b=6$, $F_b(n_{SRS})=\lceil N_b/2\rceil n_{SRS}/\Pi_{b'=b_{hop}} N_{b'}\rfloor=\lfloor n_{SRS}/P_2\rfloor=0$, and $\lceil 4n_{RRC}/m_{SRS,b}\rceil=15$.

It can be seen from the foregoing calculation that, when the UE SRS counter is $n_{SRS}=0$, indexes corresponding to a frequency position at each layer are respectively $n_b=0$, 2, 1, 0. As $n_{SRS}$ increases, a user SRS frequency bopping process is shown in Table 4.

TABLE 4

Reference table of a calculation process of SRS frequency hopping

| $n_{SRS}$ | $[n_{SRS}/P_{0,1,2}]$ | $F_{1,2,3}(n_{SRS}) + [4n_{RRC}/m_{SRS,b}]$ | $n_b$ |
|---|---|---|---|
| 0 | 0, 0, 0 | 2, 5, 15 | 0, 2, 1, 0 |
| 1 | 1, 0,0 | 3, 5, 15 | 0, 0, 1, 0 |
| 2 | 2, 0, 0 | 4, 5, 15 | 0, 1, 1, 0 |
| 3 | 3, 1, 0 | 5, 6, 15 | 0, 2, 0, 0 |
| 4 | 4, 1, 0 | 6, 6, 15 | 0, 0, 0, 0 |
| 5 | 5, 1, 0 | 7, 6, 15 | 0, 1, 0, 0 |
| 6 | 6, 2, 1 | 8, 7, 16 | 0, 2, 1, 1 |
| 7 | 7, 2, 1 | 9, 7, 16 | 0, 0, 1, 1 |
| 8 | 8, 2, 1 | 10, 7, 16 | 0, 1, 1, 1 |
| 9 | 9, 3, 1 | 11, 8, 16 | 0, 2, 0, 1 |
| 10 | 10, 3, 1 | 12, 8, 16 | 0, 0, 0, 1 |
| 11 | 11, 3, 1 | 13, 8, 16 | 0, 1, 0, 1 |
| 12 | 12, 4, 2 | 14, 9, 17 | 0, 2, 1, 2 |
| 13 | 13, 4, 2 | 15, 9, 17 | 0, 0, 1, 2 |
| 14 | 14, 4, 2 | 16, 9, 17 | 0, 1, 1, 2 |
| 15 | 15, 5, 2 | 17, 10, 17 | 0, 2, 0, 2 |
| 16 | 16, 5, 2 | 18, 10, 17 | 0, 0, 0, 2 |
| 17 | 17, 5, 2 | 19, 10, 17 | 0, 1, 0, 2 |

Figure 5:
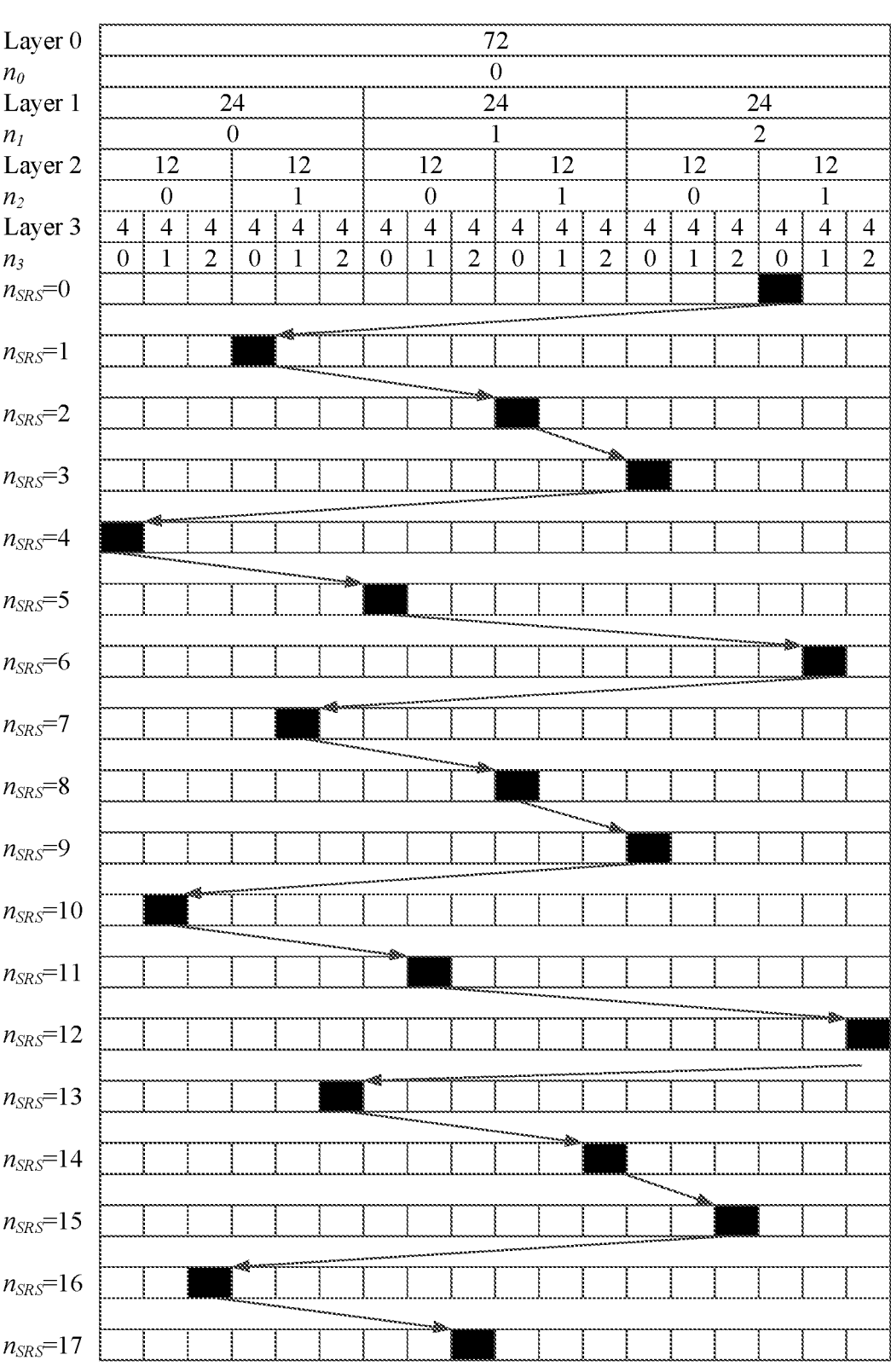
FIG. 5 is a schematic diagram of mapping of SRS frequency hopping according to an embodiment of this application.

With reference to the foregoing table, mapping of the user SRS frequency hopping in frequency domain is shown in FIG. 5.

It can be learned from FIG. 5 that an SRS frequency band resource of a specified user can cover an SRS bandwidth of an entire cell by $\Pi_{b'=0}^{B_{SRS}}$, $=N_0 N_1 N_2 N_3=1\times3\times2\times3=18$ times of frequency hopping. In addition, it should be further noted that the frequency hopping manner is merely an example and is not intended to limit this embodiment of this application.

A main advantage of a wideband (non-frequency hopping) SRS transmission is that an entire frequency band can be reported to the network device by using only one SRS transmission. As long as {1, 2, 4} symbol/symbols of the last six symbols of the subframe is/are to be used to send the SRS (regardless of a wideband SRS or a narrow band SRS (frequency hopping)), these symbols cannot be used for uplink data transmission of all terminal devices in the cell. Therefore, in terms of resource utilization, a wideband SRS transmission efficiency is higher. In this case, an entire bandwidth can be sounded by using fewer symbols. However, the narrow band SRS needs to use four time domain symbols to report the entire frequency band to the network device, as shown in FIG. 1.

However, when an uplink path loss is high, the wideband SRS transmission may lead to a low received power spectral density, which may affect a channel estimation result. Specifically, if transmit power is fixed, the transmit power is evenly allocated to a broader bandwidth, and lower power is allocated to each RE. In this case, a plurality of narrow band SRSs can be used to centralize available transmission power in a narrower frequency range and perform frequency hopping in the entire frequency band, to increase a gain.

Further, during narrow band SRS transmission, when the bandwidth occupied by each symbol of the SRS is large, the received power spectrum density is low, which may affect the channel estimation result. When the bandwidth occupied by each symbol of the SRS is small, a quantity of measurement times required for completing a round of system bandwidth measurement is large, and measurement time is also long, which reduce efficiency of channel quality measurement of the system. However, when the terminal device sends the SRS on a fixed bandwidth part in the bandwidth of each symbol, channel estimation of a bandwidth part without SRS sending may be inaccurate, and performance of the bandwidth part is poor, as shown in FIG. 2. It should be noted that, the terminal device shown in FIG. 2 sends the SRS on the fixed bandwidth part in the bandwidth of each symbol in the frequency hopping manner. The frequency hopping manner shown in FIG. 2 is merely used for describing the SRS frequency domain resource occupation manner. The time domain resource occupied by the SRS may be consecutive time domain symbols or non-consecutive time domain symbols.

In view of this, an embodiment of this application provides a communication method, to resolve inaccurate channel estimation of the bandwidth part without SRS sending, and poor performance of the bandwidth part caused by inaccurate channel estimation, and achieve efficiency of both uplink coverage and system channel quality measurement. As shown in FIG. 6, the method includes the following steps.

Step 601: A network device sends first information to a terminal device. The first information indicates an SRS frequency domain resource. The SRS frequency domain resource includes a first frequency domain unit and a second frequency domain unit. The first frequency domain unit is different from the second frequency domain unit. The first frequency domain unit is a frequency domain resource occupied by an SRS on a first frequency hopping subband in a first frequency hopping period. The second frequency domain unit is a frequency domain resource occupied by the SRS on the first frequency hopping subband in a second frequency hopping period. The first frequency hopping subband is one of a plurality of frequency hopping subbands.

For example, the first information can be carried by using RRC, MAC CE, or DCI.

It should be noted that an SRS configured bandwidth includes one or more frequency hopping subbands in this embodiment of this application. For example, the SRS configured bandwidth includes L frequency hopping subbands, and L is a positive integer. For example, the terminal device determines, based on parameters $b_{hop}$ and $C_{SRS}$ that are configured by the network device for the terminal device, and Table 3, a quantity $m_{SRS,b'}$ of RBs, namely, the SRS configured bandwidth (which is also referred to as a frequency hopping bandwidth), occupied by an entire SRS, where $b'=b_{hop}$. The terminal device determines, based on parameters $B_{SRS}$ and $C_{SRS}$ that are configured by the network device for the terminal device, and Table 3, a quantity $m_{SRS,b}$ of RBs, namely, the frequency hopping subband, occupied by the SRS on each symbol, where $b=B_{SRS}$.

Each frequency hopping subband has a same bandwidth (that is, each frequency hopping subband occupies a same quantity of RBs). For example, any two frequency hopping subbands do not overlap, that is, any two frequency hopping subbands do not include a same RB. The first frequency hopping subband is any one of the one or more frequency hopping subbands. The second frequency hopping subband is any one of the one or more frequency hopping subbands. The first frequency hopping subband is different from the second frequency hopping subband.

A frequency hopping period can also be referred to as a scan period, and is time required for the SRS to complete scanning of an entire SRS configured bandwidth. It should be understood that, if a time-frequency resource of the SRS is a periodic reference signal resource or a semi-periodic reference signal resource, a plurality of SRS periods are required for completing scanning of the entire SRS configured bandwidth.

For example, the SRS configured bandwidth includes M frequency hopping subbands, and M is a positive integer. The terminal device sends the SRS on M symbols in a frequency hopping manner. The terminal device sends, according to a frequency hopping formula, the SRS on an $i^{th}$ symbol and on a frequency hopping subband corresponding to the $i^{th}$ symbol. In this case, the frequency hopping period is M symbols.

The first frequency hopping period and the second frequency hopping period may be two consecutive frequency hopping periods, or the first frequency hopping period and the second frequency hopping period are non-consecutive frequency hopping periods.

It may be understood that the first information can further indicate the SRS time domain resource. This is not limited in this embodiment of this application.

That the first frequency domain unit is different from the second frequency domain unit may mean that the first frequency domain unit is completely or partially different from the second frequency domain unit.

The following describes the first frequency domain unit and the second frequency domain unit by using examples.

In some embodiments, the first frequency domain unit is less than a frequency domain resource occupied by the first frequency hopping subband, and the second frequency domain unit is less than the frequency domain resource occupied by the first frequency hopping subband. Alternatively, the first frequency domain unit is less than a frequency domain resource occupied by the first frequency hopping subband, and the second frequency domain unit is equal to the frequency domain resource occupied by the first frequency hopping subband. Alternatively, the first frequency domain unit is equal to a frequency domain resource occupied by the first frequency hopping subband, and the second frequency domain unit is less than the frequency domain resource occupied by the first frequency hopping subband.

In some embodiments, the first frequency domain unit includes one or more RBs, and the second frequency domain unit includes one or more RBs. For example, in the following example 1, the first frequency domain unit includes a plurality of consecutive RBs, and the second frequency domain unit includes a plurality of consecutive RBs. Alternatively, in the following example 2, the first frequency domain unit includes a plurality of consecutive RBs, and the second frequency domain unit includes a plurality of RBs. However, the plurality of RBs included in the second frequency domain unit are non-consecutive. Alternatively, in the following example 3, the first frequency domain unit includes a plurality of RBs. However, the plurality of RBs included in the first frequency domain unit are non-consecutive. The second frequency domain unit includes a plurality of consecutive RBs. Alternatively, in the following example 4, the first frequency domain unit includes a plurality of RBs but the plurality of RBs included in the first frequency domain unit are non-consecutive. The second frequency domain unit includes a plurality of RBs but the plurality of RBs included in the second frequency domain unit are non-consecutive.

In some embodiments, in the following example 7, a quantity of RBs included in the first frequency domain unit is the same as a quantity of RBs included in the second frequency domain unit. Alternatively, in the following example 6, a quantity of RBs included in the first frequency domain unit is different from a quantity of RBs included in the second frequency domain unit.

In some embodiments, the first frequency domain unit and the second frequency domain unit do not overlap, that is, the first frequency domain unit and the second frequency domain unit do not include a same RB. Alternatively, in the following example 7, the first frequency domain unit and the second frequency domain unit have an overlapping frequency domain resource, that is. the first frequency domain unit and the second frequency domain unit include a same RB.

For example, the first frequency hopping subband includes four consecutive RBs. Based on a sequence of the frequency domain, the four consecutive RBs are respectively an RB 1, an RB 2, an RB 3, and an RB 4. The sequence of the frequency domain herein means an ascending order or a descending order of RB sequence numbers. The RB included in the first frequency domain unit and the RB included in the second frequency domain unit may include but are not limited to the following examples.

Example 1: The first frequency domain unit includes the RB 1 and the RB 2, and the second frequency domain unit includes the RB 3 and the RB 4.

Example 2: The first frequency domain unit includes the RB 1 and the RB 2, and the second frequency domain unit includes the RB 1 and the RB 3.

Example 3: The first frequency domain unit includes the RB 2 and the RB 4, and the second frequency domain unit includes the RB 3 and the RB 4.

Example 4: The first frequency domain unit includes the RB 2 and the RB 4, and the second frequency domain unit includes the RB 1 and the RB 3.

Example 5: The first frequency domain unit includes the RB 1, and the second frequency domain unit includes the RB 2.

Example 6: The first frequency domain unit includes the RB 1, and the second frequency domain unit includes the RB 2 and the RB 3.

Example 7: The first frequency domain unit includes the RB 1 and the RB 2, and the second frequency domain unit includes the RB 2 and the RB 3.

It can be understood that the foregoing examples are merely examples and are not intended to limit this embodiment of this application.

In addition, in some embodiments, the SRS frequency domain resource further includes a third frequency domain unit. The third frequency domain unit is a frequency domain resource occupied by the SRS on a second frequency hopping subband in the first frequency hopping period. The second frequency hopping subband is a frequency hopping subband that is in the plurality of frequency hopping subbands and that is different from the first frequency hopping subband. A frequency domain offset of a starting position of the first frequency domain unit relative to a starting position of the first frequency hopping subband is the same as a frequency domain offset of a starting position of the third frequency domain unit relative to a starting position of the second frequency hopping subband.

For example, if the starting position of the first frequency domain unit is an RB 0, and the starting position of the first frequency hopping subband is an RB 0, the frequency domain offset of the starting position of the first frequency domain unit relative to the starting position of the first frequency hopping subband is 0 RBs. In other words, an RB in which the starting position of the first frequency domain unit is located is the same as an RB in which the starting position of the first frequency hopping subband is located. A difference between a sequence number of the RB in which the starting position of the first frequency domain unit is located and a sequence number of the RB in which the starting position of the first frequency hopping subband is located is 0.

For another example, if the starting position of the first frequency domain unit is the RB 1, and the starting position of the first frequency hopping subband is an RB 0, a frequency domain offset of the starting position of the first frequency domain unit relative to the starting position of the first frequency hopping subband is one RB. In other words, an RB in which the starting position of the first frequency domain unit is located is separated from an RB in which the starting position of the first frequency hopping subband is located by 0 RBs, or a difference between a sequence number of the RB in which the starting position of the first frequency domain unit is located and a sequence number of the RB in which the starting position of the first frequency hopping subband is located is 1.

For another example, if the starting position of the first frequency domain unit is the RB 2, and the starting position of the first frequency hopping subband is an RB 0, the frequency domain offset of the starting position of the first frequency domain unit relative to the starting position of the first frequency hopping subband is two RBs. In other words, an RB in which the starting position of the first frequency domain unit is located is separated from an RB in which the starting position of the first frequency hopping subband is located by one RB, or a difference between a sequence number of the RB in which the starting position of the first frequency domain unit is located and a sequence number of the RB in which the starting position of the first frequency hopping subband is located is 2.

For example, the SRS configured bandwidth includes L frequency hopping subbands, and L is a positive integer greater than or equal to 2. In the first frequency hopping period, a frequency domain offset of a starting position of a frequency domain resource occupied by the SRS on an $i^{th}$ frequency hopping subband relative to a starting position of the $i^{th}$ frequency hopping subband is the same as a frequency domain offset of a starting position of a frequency domain resource occupied by the SRS on a $j^{th}$ frequency hopping subband relative to a starting position of the $j^{th}$ frequency hopping subband, where i≠j, and i and j are both positive integers.

For example, the first frequency hopping subband includes four consecutive RBs. Based on the sequence of the frequency domain, the four consecutive RBs are respectively an RB 1, an RB 2, an RB 3, and an RB 4. The second frequency hopping subband includes four consecutive RBs. Based on the sequence of the frequency domain, the four consecutive RBs are respectively an RB 1', an RB 2', an RB 3', and an RB 4'. The first frequency hopping subband and the second frequency hopping subband may be adjacent frequency hopping subbands or non-adjacent frequency hopping subbands. The first frequency hopping subband and the second frequency hopping subband do not have an overlapping frequency domain resource. The RB included in the first frequency domain unit and the RB included in the third frequency domain unit may include but are not limited to the following examples.

Example 1: The first frequency domain unit includes the RB 1 and the RB 2, and the third frequency domain unit includes the RB 1' and the RB 2'.

Example 2: The first frequency domain unit includes the RB 3, and the second frequency domain unit includes the RB 3'.

It can be understood that the foregoing examples are merely examples and are not intended to limit this embodiment of this application.

In some embodiments, a frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units. A frequency domain width occupied by the N frequency domain units is less than a bandwidth of the first frequency hopping subband. N is a positive integer. For example, each frequency domain unit can include one RB or a plurality of consecutive RBs.

For example, the first frequency hopping subband includes four consecutive RBs. Based on the frequency domain sequence, the four consecutive RBs are respectively an RB 1, an RB 2, an RB 3, and an RB 4. The RB included in the first frequency domain unit and the RB included in the second frequency domain unit may include but are not limited to the following examples.

Example 1: Each frequency domain unit may include one RB. The frequency domain offset of the starting position of the first frequency domain unit relative to the starting position of the first frequency hopping subband differs from the frequency domain offset of the starting position of the second frequency domain unit relative to the starting position of the first frequency hopping subband by one frequency domain unit. For example, if the first frequency domain unit includes the RB 1, and the second frequency domain unit includes the RB 2, a frequency domain unit in which the first frequency domain unit is located is separated from a frequency domain unit in which the second frequency domain unit is located by 0 frequency domain units, or a difference between a sequence number of a frequency domain unit in which the first frequency domain unit is located and a sequence number of a frequency domain unit in which the second frequency domain unit is located is 1.

Each frequency domain unit may include two RBs. The frequency domain offset of the starting position of the first frequency domain unit relative to the starting position of the first frequency hopping subband differs from the frequency domain offset of the starting position of the second frequency domain unit relative to the starting position of the first frequency hopping subband by one frequency domain unit. For example, if the first frequency domain unit includes the RB 1, and the second frequency domain unit includes the RB 3, the frequency domain unit in which the first frequency domain unit is located is separated from a frequency domain unit in which the second frequency domain unit is located by one frequency domain unit, or a difference between the sequence number of the frequency domain unit in which the first frequency domain unit is located and a sequence number of a frequency domain unit in which the second frequency domain unit is located is 2.

Example 2: Each frequency domain unit may include two RBs. The frequency domain offset of the starting position of the first frequency domain unit relative to the starting position of the first frequency hopping subband differs from the frequency domain offset of the starting position of the second frequency domain unit relative to the starting position of the first frequency hopping subband by one frequency domain unit. For example, if the first frequency domain unit includes the RB 1, and the second frequency domain unit includes the RB 3, the frequency domain unit in which the first frequency domain unit is located is separated from a frequency domain unit in which the second frequency domain unit is located by 0 frequency domain units, or a difference between the sequence number of the frequency domain unit in which the first frequency domain unit is located and a sequence number of a frequency domain unit in which the second frequency domain unit is located is 1.

It can be understood that the foregoing examples are merely examples and are not intended to limit this embodiment of this application.

In addition, for W consecutive frequency hopping periods, a frequency domain resource occupied by the SRS on the first frequency hopping subband covers the first frequency hopping subband, and W is a positive integer greater than or equal to 2.

In some embodiments, the first frequency hopping period and the second frequency hopping period may be any two of the W consecutive frequency hopping periods.

In some embodiments, W is equal to a quantity of RBs included in the first frequency hopping subband divided by a quantity of RBs included in a frequency domain resource occupied by one SRS transmission on the first frequency hopping subband. In different frequency hopping periods, quantities of RBs included in the frequency domain resource occupied by the SRS on the first frequency hopping subband are the same.

For example, in the W consecutive frequency hopping periods, the frequency domain resource occupied by the SRS on the first frequency hopping subband do not have an overlapping frequency domain resource. Alternatively, in the W consecutive frequency hopping periods, at least two of frequency domain resources occupied by the SRS on the first frequency hopping subband have overlapping frequency domain resources.

For example, the first frequency hopping subband includes four consecutive RBs. Based on the frequency domain sequence, the four consecutive RBs are respectively an RB 1, an RB 2, an RB 3, and an RB 4. In four consecutive frequency hopping periods, frequency domain resources occupied by the SRS on the first frequency hopping subband are successively the RB 1, the RB 2, the RB 3, and the RB 4. Alternatively, in two consecutive frequency hopping periods, frequency domain resources occupied by the SRS on the first frequency hopping subband are successively the RB 1 and the RB 2, and the RB 3 and the RB 4. Alternatively, in three consecutive frequency hopping periods, frequency domain resources occupied by the SRS on the first frequency hopping subband are successively the RB 1 and the RB 2. the RB 3, and the RB 3 and the RB 4.

In some embodiments, the first frequency hopping subband includes the frequency domain unit 1, the frequency domain unit 2, the frequency domain unit 3, and the frequency domain unit 4 in the frequency domain sequence.

Figure 7:
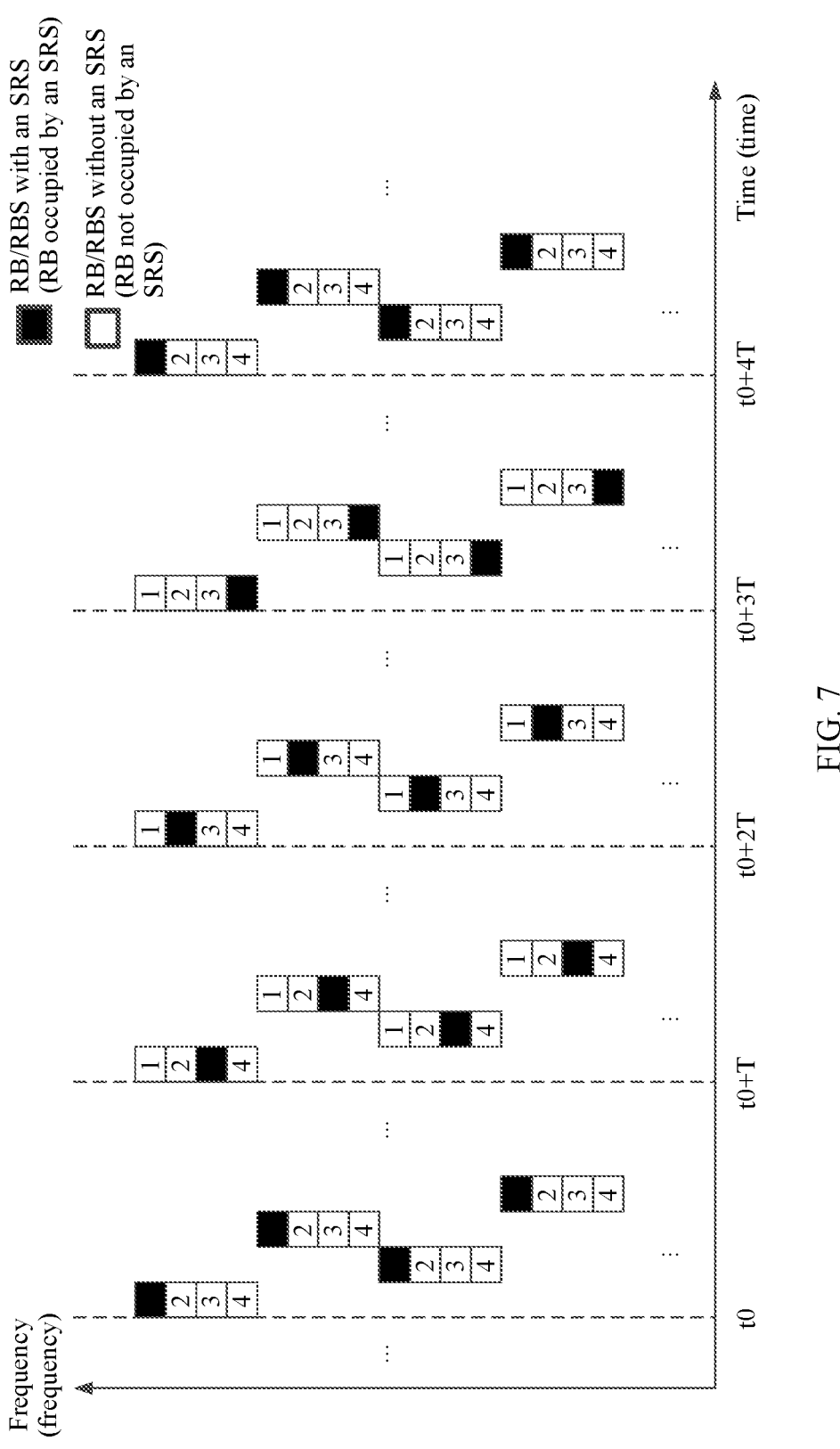
FIG. 7 is a schematic diagram 1 of an SRS frequency domain resource occupation manner according to an embodiment of this application.

In four consecutive frequency hopping periods, an SRS frequency domain resource occupation manner on the first frequency hopping subband is any one of the following:

Manner 1: The four consecutive frequency hopping periods successively occupy the frequency domain unit 1, the frequency domain unit 3, the frequency domain unit 2, and the frequency domain unit 4. It can be understood that an SRS frequency domain resource occupation manner on another frequency hopping subband other than the first frequency hopping subband may be similar to the SRS frequency domain resource occupation manner on the first frequency hopping subband. For example, in the four consecutive frequency hopping periods, an SRS frequency domain resource occupation manner may be shown in FIG. 7. A frequency hopping manner shown in FIG. 7 is referred to as a first frequency hopping manner below.

Figure 8:
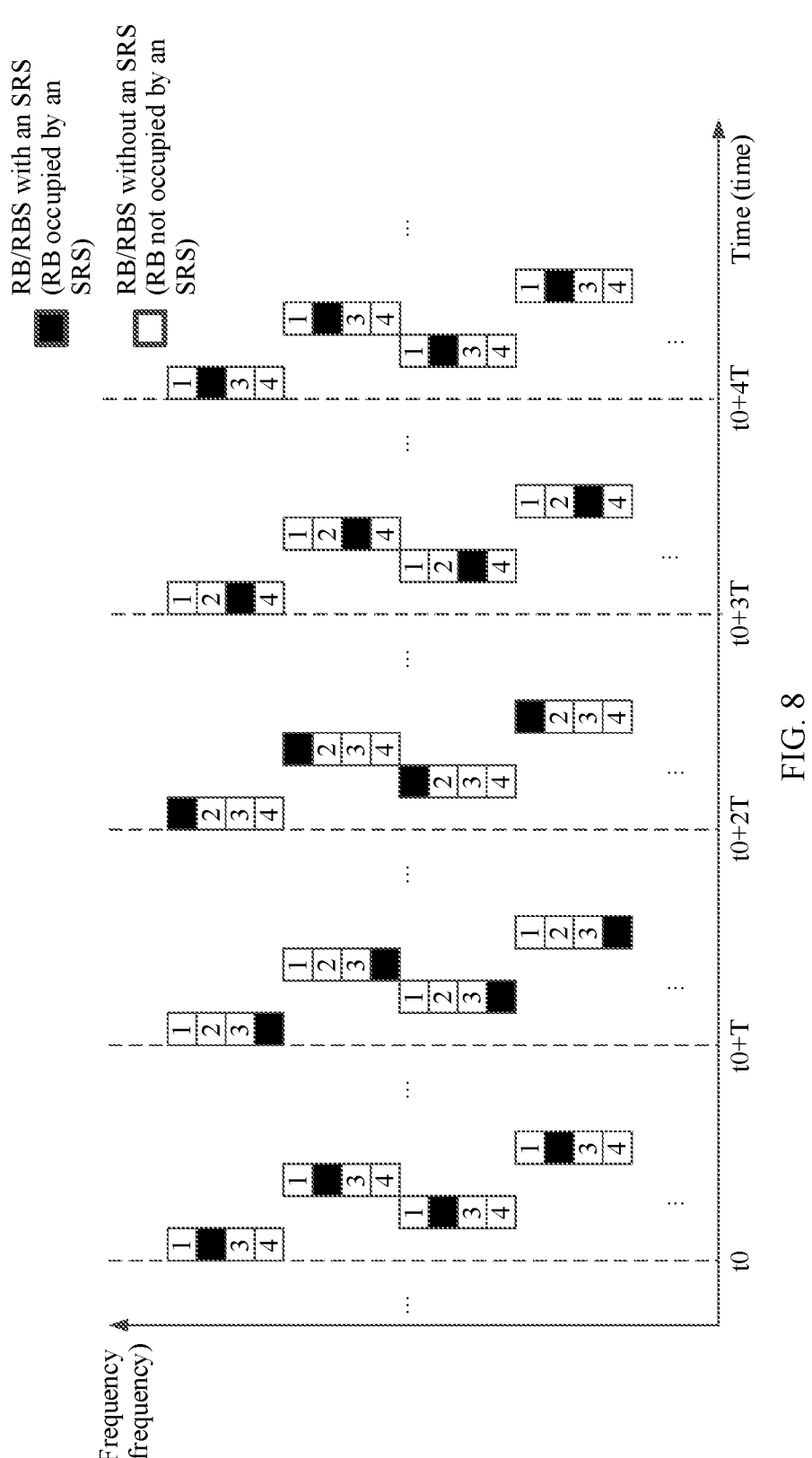
FIG. 8 is a schematic diagram 2 of an SRS frequency domain resource occupation manner according to an embodiment of this application.

Manner 2: The four consecutive frequency hopping periods successively occupy the frequency domain unit 2, the frequency domain unit 4, the frequency domain unit 1, and the frequency domain unit 3. It can be understood that an SRS frequency domain resource occupation manner on another frequency hopping subband other than the first frequency hopping subband may be similar to the SRS frequency domain resource occupation manner on the first frequency hopping subband. For example, in the four consecutive frequency hopping periods, an SRS frequency domain resource occupation manner may be shown in FIG. 8. A frequency hopping manner shown in FIG. 8 is referred to as a second frequency hopping manner below.

Figure 9:
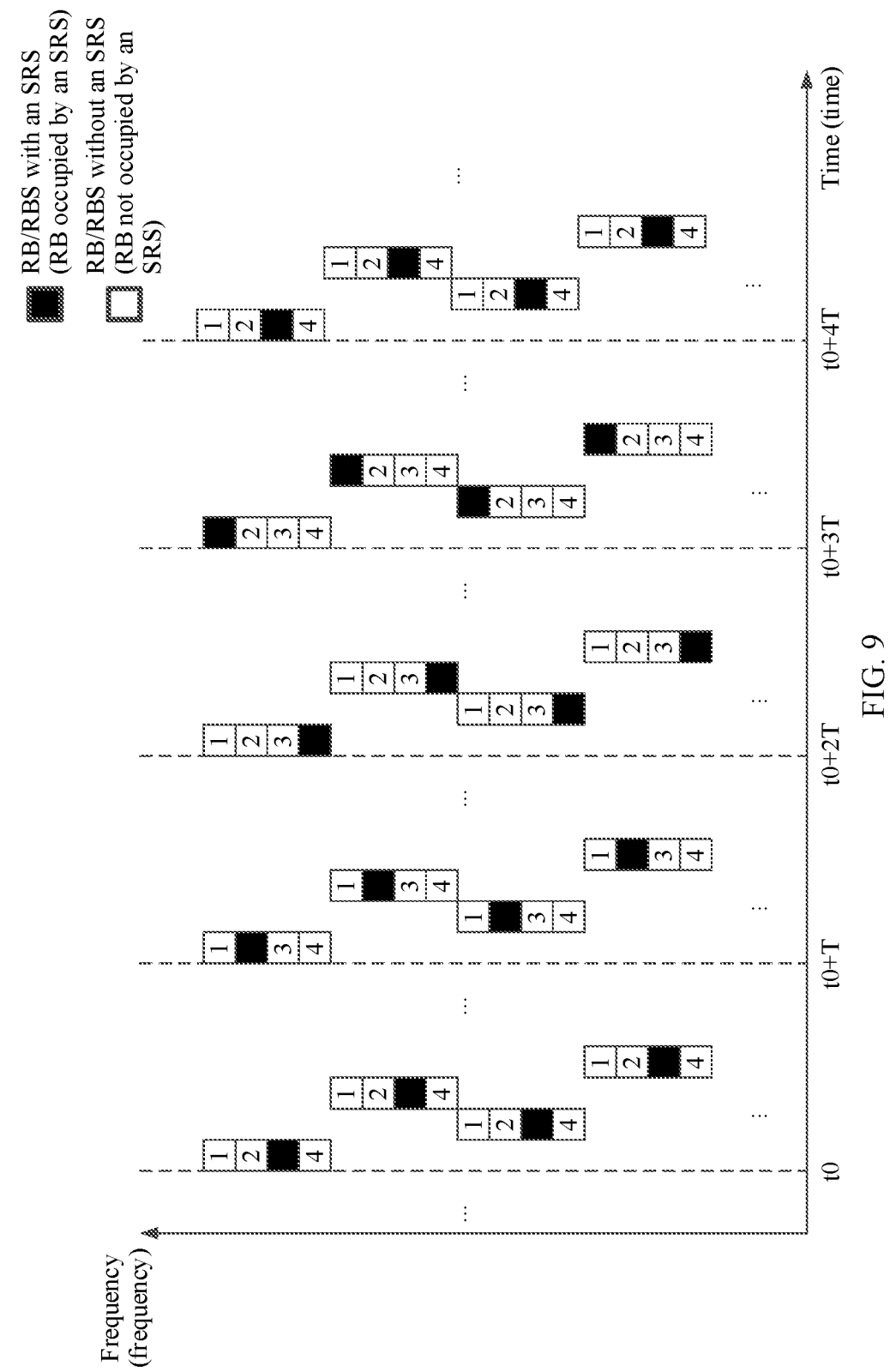
FIG. 9 is a schematic diagram 3 of an SRS frequency domain resource occupation manner according to an embodiment of this application.

Manner 3: The four consecutive frequency hopping periods successively occupy the frequency domain unit 3, the frequency domain unit 2, the frequency domain unit 4, and the frequency domain unit 1. It can be understood that an SRS frequency domain resource occupation manner on another frequency hopping subband other than the first frequency hopping subband may be similar to the SRS frequency domain resource occupation manner on the first frequency hopping subband. For example, in the four consecutive frequency hopping periods, an SRS frequency domain resource occupation manner may be shown in FIG. 9. A frequency hopping manner shown in FIG. 9 is referred to as a third frequency hopping manner below.

Figure 10:
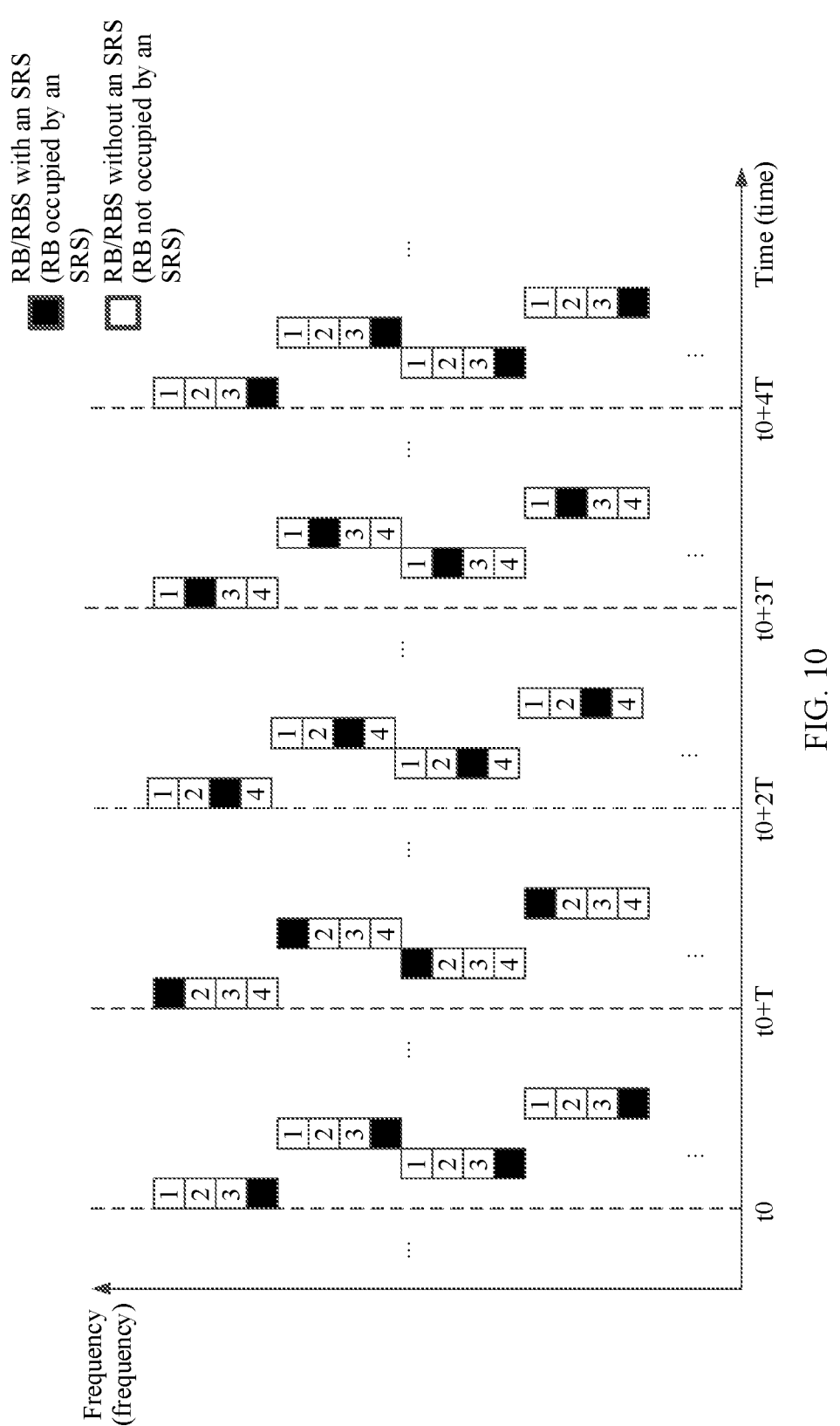
FIG. 10 is a schematic diagram 4 of an SRS frequency domain resource occupation manner according to an embodiment of this application.

Manner 4: The four consecutive frequency hopping periods successively occupy the frequency domain unit 4, the frequency domain unit 1, the frequency domain unit 3, and the frequency domain unit 2. It can be understood that an SRS frequency domain resource occupation manner on another frequency hopping subband other than the first frequency hopping subband may be similar to the SRS frequency domain resource occupation manner on the first frequency hopping subband. For example, in the four consecutive frequency hopping periods, an SRS frequency domain resource occupation manner may be shown in FIG. 10. A frequency hopping manner shown in FIG. 10 is referred to as a fourth frequency hopping manner below.

Figure 11:
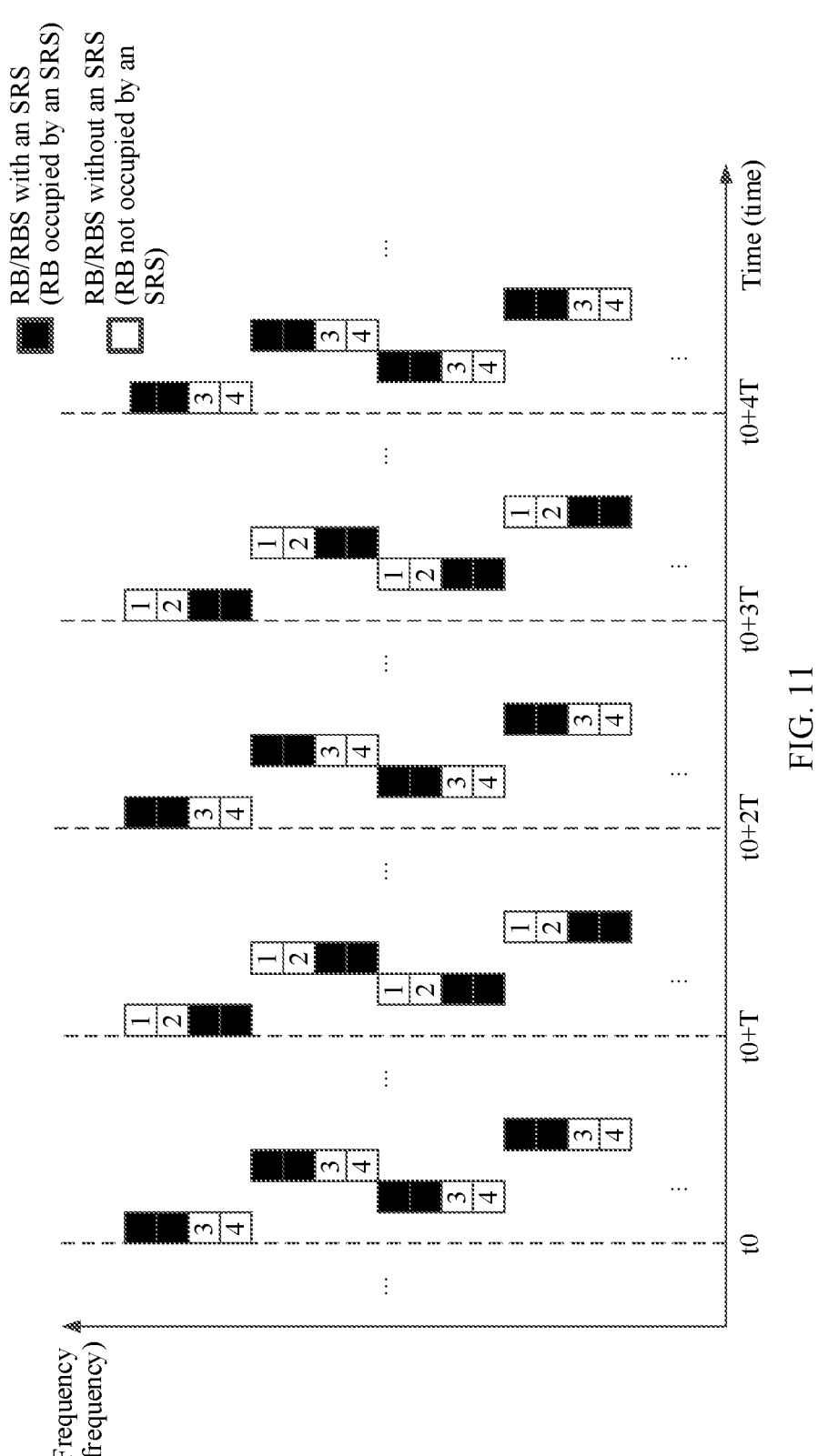
FIG. 11 is a schematic diagram 5 of an SRS frequency domain resource occupation manner according to an embodiment of this application.

In two consecutive frequency hopping periods, an SRS frequency domain resource occupation manner on the first frequency hopping subband is any one of the following:

Manner 5: The two consecutive frequency hopping periods successively occupy the frequency domain unit 1 and the frequency domain unit 2, and the frequency domain unit 3 and the frequency domain unit 4. It can be understood that an SRS frequency domain resource occupation manner on another frequency hopping subband other than the first frequency hopping subband may be similar to the SRS frequency domain resource occupation manner on the first frequency hopping subband. For example, in the two consecutive frequency hopping periods, an SRS frequency domain resource occupation manner may be shown in FIG. 11. A frequency hopping manner shown in FIG. 11 is referred to as a fifth frequency hopping manner below.

Figure 12:
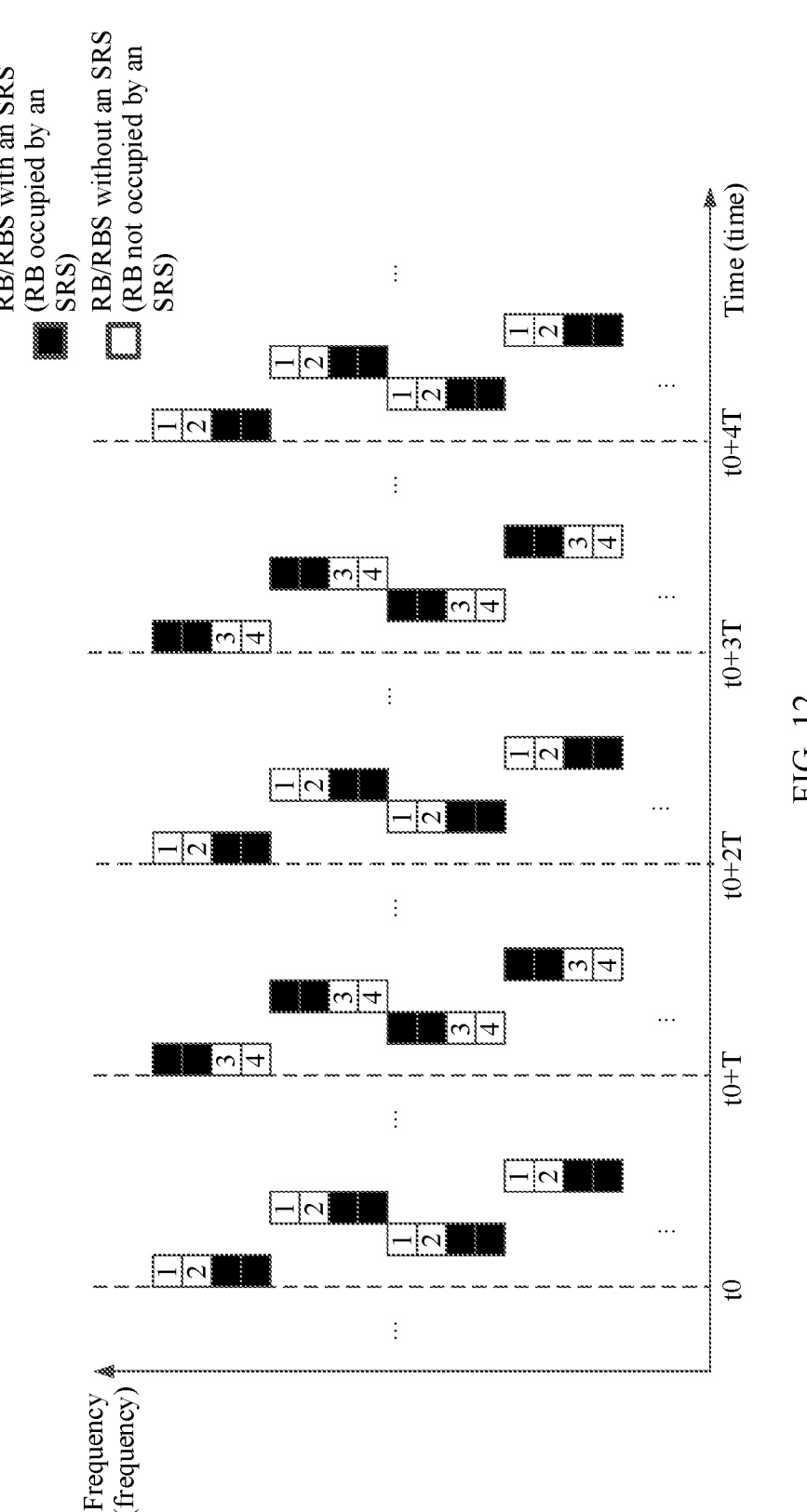
FIG. 12 is a schematic diagram 6 of an SRS frequency domain resource occupation manner according to an embodiment of this application.

Manner 6: The two consecutive frequency hopping periods successively occupy the frequency domain unit 3 and the frequency domain unit 4, and the frequency domain unit 1 and the frequency domain unit 2. It can be understood that an SRS frequency domain resource occupation manner on another frequency hopping subband other than the first frequency hopping subband may be similar to the SRS frequency domain resource occupation manner on the first frequency hopping subband. For example, in the two consecutive frequency hopping periods, an SRS frequency domain resource occupation manner may be shown in FIG. 12. A frequency hopping manner shown in FIG. 12 is referred to as a sixth frequency hopping manner below.

For the manner 1 to the manner 6, it should be noted that, in this embodiment of this application, different frequency domain resource occupation manners of the SRS on different frequency hopping subbands are not excluded. In addition to the manner 1 to the manner 6, there are a plurality of other possible frequency domain resource occupation manners of the SRS on the first frequency hopping subband. This is not limited in this embodiment of this application. For example, the four consecutive frequency hopping periods successively occupy the frequency domain unit 1, the frequency domain unit 2, the frequency domain unit 3 and the frequency domain unit 4.

In addition, FIG. 7 to FIG. 12 merely describe the SRS frequency domain resource occupation manner. The SRS time domain resource occupation manner is not limited in this embodiment of this application. Specifically, the SRS may be sent on consecutive time domain symbols, or may be sent on non-consecutive time domain symbols.

Further, the first information may further indicate the SRS frequency domain resource occupation manner. For example, the first information may further indicate that the SRS frequency domain resource occupation manner is any one of a first frequency hopping manner, a second frequency hopping manner, a third frequency hopping manner, a fourth frequency hopping manner, a fifth frequency hopping manner, or a sixth frequency hopping manner. Alternatively, the first information may further indicate that the SRS frequency domain resource occupation manner is any one of a first frequency hopping manner, a second frequency hopping manner, a third frequency hopping manner, or a fourth frequency hopping manner. Alternatively. the first information may further indicate that the SRS frequency domain resource occupation manner is any one of a fifth frequency hopping manner or a sixth frequency hopping manner. For example, the first information includes a first field, the first field includes three bits, and the first field indicates the SRS frequency domain resource occupation manner. That a first field is 000 indicates that the SRS frequency domain resource occupation manner is the first frequency hopping manner. That a first field is 001 indicates that the SRS frequency domain resource occupation manner is the second frequency hopping manner. That a first field is 010 indicates that the SRS frequency domain resource occupation manner is the third frequency hopping manner. That a first field is 011 indicates that the SRS frequency domain resource occupation manner is the fourth frequency hopping manner. That a first field is 100 indicates that the SRS frequency domain resource occupation manner is the fifth frequency hopping manner. That a first field is 101 indicates that the SRS frequency domain resource occupation manner is the sixth frequency hopping manner.

In some embodiments, the first frequency hopping subband includes four frequency domain units in the frequency domain sequence. The first frequency hopping subband includes the frequency domain unit 1, the frequency domain unit 2, the frequency domain unit 3, and the frequency domain unit 4 in the frequency domain sequence.

An offset of the SRS frequency domain resource on the first frequency hopping subband is a quantity of frequency domain units by which the starting position of the frequency domain resource occupied by the SRS on the first frequency hopping subband is offset from the starting position of the first frequency hopping subband.

In the four consecutive frequency hopping periods, the offset of the SRS frequency domain resource on the first frequency hopping subband is any one of the following:

The four consecutive frequency hopping periods are successively 0, 2, 1, and 3. For example, if each frequency domain resource occupied by the SRS on the first frequency hopping subband is one frequency domain unit, an offset of the SRS frequency domain resource on the first frequency hopping subband is 0, meaning that the frequency domain resource occupied by the SRS on the first frequency hopping subband is the frequency domain unit 1. An offset 2 of the SRS frequency domain resource on the first frequency hopping subband means that the frequency domain resource occupied by the SRS on the first frequency hopping subband is the frequency domain unit 3. An offset 1 of the SRS frequency domain resource on the first frequency hopping subband means that the frequency domain resource occupied by the SRS on the first frequency hopping subband is the frequency domain unit 2. An offset 3 of the SRS frequency domain resource on the first frequency hopping subband means that the frequency domain resource occupied by the SRS on the first frequency hopping subband is the frequency domain unit 4. It can be understood that, the offset of the SRS frequency domain resource on another frequency hopping subband other than the first frequency hopping subband can be similar to the offset of the SRS frequency domain resource on the first frequency hopping subband. For example, in the four consecutive frequency hopping periods, the offset of the SRS frequency domain resource may be shown in FIG. 7. The offset of the SRS frequency domain resource shown in FIG. 7 is referred to as a first offset set.

Alternatively, the four consecutive frequency hopping periods are successively 1, 3, 0, and 2. For example, if each frequency domain resource occupied by the SRS on the first frequency hopping subband is one frequency domain unit, an offset 1 of the SRS frequency domain resource on the first frequency hopping subband means that the frequency domain resource occupied by the SRS on the first frequency hopping subband is the frequency domain unit 2. An offset 3 of the SRS frequency domain resource on the first frequency hopping subband means that the frequency domain resource occupied by the SRS on the first frequency hopping subband is the frequency domain unit 4. An offset 0 of the SRS frequency domain resource on the first frequency hopping subband means that the frequency domain resource occupied by the SRS on the first frequency hopping subband is the frequency domain unit 1. An offset 2 of the SRS frequency domain resource on the first frequency hopping subband means that the frequency domain resource occupied by the SRS on the first frequency hopping subband is the frequency domain unit 3. It can be understood that, the offset of the SRS frequency domain resource on another frequency hopping subband other than the first frequency hopping subband can be similar to the offset of the SRS frequency domain resource on the first frequency hopping subband. For example, in the four consecutive frequency hopping periods, the offset of the SRS frequency domain resource may be shown in FIG. 8. The offset of the SRS frequency domain resource shown in FIG. 8 is referred to as a second offset set.

Alternatively, offsets of the SRS respectively corresponding to the four consecutive frequency hopping periods are successively 2, 1, 3, and 0. For example, if each frequency domain resource occupied by the SRS on the first frequency hopping subband is one frequency domain unit, an offset 2 of the SRS frequency domain resource on the first frequency hopping subband means that the frequency domain resource occupied by the SRS on the first frequency hopping subband is the frequency domain unit 3. An offset 1 of the SRS frequency domain resource on the first frequency hopping subband means that the frequency domain resource occupied by the SRS on the first frequency hopping subband is the frequency domain unit 2. An offset 3 of the SRS frequency domain resource on the first frequency hopping subband means that the frequency domain resource occupied by the SRS on the first frequency hopping subband is the frequency domain unit 4. An offset 0 of the SRS frequency domain resource on the first frequency hopping subband means that the frequency domain resource occupied by the SRS on the first frequency hopping subband is the frequency domain unit 1. It can be understood that, the offset of the SRS frequency domain resource on another frequency hopping subband other than the first frequency hopping subband can be similar to the offset of the SRS frequency domain resource on the first frequency hopping subband. For example, in the four consecutive frequency hopping periods. the offset of the SRS frequency domain resource may be shown in FIG. 9. The offset of the SRS frequency domain resource shown in FIG. 9 is referred to as a third offset set.

Alternatively, offsets of the SRS respectively corresponding to the four consecutive frequency hopping periods are successively 3, 0, 2, and 1. For example, if each frequency domain resource occupied by the SRS on the first frequency hopping subband is one frequency domain unit, an offset 3 of the SRS frequency domain resource on the first frequency hopping subband means that the frequency domain resource occupied by the SRS on the first frequency hopping subband is the frequency domain unit 4. An offset 0 of the SRS frequency domain resource on the first frequency hopping subband means that the frequency domain resource occupied by the SRS on the first frequency hopping subband is the frequency domain unit 1. An offset 3 of the SRS frequency domain resource on the first frequency hopping subband means that the frequency domain resource occupied by the SRS on the first frequency hopping subband is the frequency domain unit 3. An offset 1 of the SRS frequency domain resource on the first frequency hopping subband means that the frequency domain resource occupied by the SRS on the first frequency hopping subband is the frequency domain unit 2. It can be understood that, the offset of the SRS frequency domain resource on another frequency hopping subband other than the first frequency hopping subband can be similar to the offset of the SRS frequency domain resource on the first frequency hopping subband. For example, in the four consecutive frequency hopping periods, the offset of the SRS frequency domain resource may be shown in FIG. 10. The offset of the SRS frequency domain resource shown in FIG. 10 is referred to as a fourth offset set.

In the two consecutive frequency hopping periods. the offset of the SRS frequency domain resource on the first frequency hopping subband is any one of the following:

Offsets of the SRS respectively corresponding to the two consecutive frequency hopping periods are successively 0, and 2. For example, if each frequency domain resource occupied by the SRS on the first frequency hopping subband is two frequency domain units, an offset 0 of the SRS frequency domain resource on the first frequency hopping subband means that frequency domain resources occupied by the SRS on the first frequency hopping subband are the frequency domain unit 1 and the frequency domain unit 2. An offset 2 of the SRS frequency domain resource on the first frequency hopping subband means that frequency domain resources occupied by the SRS on the first frequency hopping subband are the frequency domain unit 3 and the frequency domain unit 4. It can be understood that, the offset of the SRS frequency domain resource on another frequency hopping subband other than the first frequency hopping subband may be similar to the offset of the SRS frequency domain resource on the first frequency hopping subband. For example, in the two consecutive frequency hopping periods, the offset of the SRS frequency domain resource may be shown in FIG. 10. The offset of the SRS frequency domain resource shown in FIG. 10 is referred to as a fifth offset set.

Alternatively, offsets of the SRS respectively corresponding to the two consecutive frequency hopping periods are successively 2, and 0. For example, if each frequency domain resource occupied by the SRS on the first frequency hopping subband is two frequency domain units, an offset 2 of the SRS frequency domain resource on the first frequency hopping subband means that frequency domain resources occupied by the SRS on the first frequency hopping subband are the frequency domain unit 3 and the frequency domain unit 4. An offset 0 of the SRS frequency domain resource on the first frequency hopping subband means that frequency domain resources occupied by the SRS on the first frequency hopping subband are the frequency domain unit 1 and the frequency domain unit 2. It can be understood that, the offset of the SRS frequency domain resource on another frequency hopping subband other than the first frequency hopping subband may be similar to the offset of the SRS frequency domain resource on the first frequency hopping subband. For example, in the two consecutive frequency hopping periods, the offset of the SRS frequency domain resource may be shown in FIG. 11. The offset of the SRS frequency domain resource shown in FIG. 1I is referred to as a sixth offset set.

For the first offset set to the sixth offset set, it should be noted that different offsets of SRS frequency domain resources on different frequency hopping subbands are not excluded in this embodiment of this application. In addition to the first offset set to the sixth offset set, there are a plurality of other possible offsets of the SRS frequency domain resource on the first frequency hopping subband. This is not limited in this embodiment of this application. For example, offsets of the SRS respectively corresponding to the four consecutive frequency hopping periods are successively 0, 1, 2, and 3.

Further, the first information may further indicate the offset of the SRS frequency domain resource. For example, the first information may further indicate that the offset of the SRS frequency domain resource is any one of the first offset set, the second offset set, the third offset set, the fourth offset set, the fifth offset set, or the sixth offset set. Alternatively, the first information may further indicate that the offset of the SRS frequency domain resource is any one of the first offset set, the second offset set, the third offset set, or the fourth offset set. Alternatively, the first information may further indicate that the offset of the SRS frequency domain resource is any one of the fifth offset set, or the sixth offset set. For example, the first information includes the first field, the first field includes three bits, and the first field indicates the offset of the SRS frequency domain resource. That the first field is 000 indicates that the offset of the SRS frequency domain resource is the first offset set. That the first field is 001 indicates that the offset of the SRS frequency domain resource is the second offset set. That the first field is 010 indicates that the offset of the SRS frequency domain resource is the third offset set. That the first field is 011 indicates that the offset of the SRS frequency domain resource is the fourth offset set. That the first field is 100 indicates that the offset of the SRS frequency domain resource is the fifth offset set. That the first field is 101 indicates that the offset of the SRS frequency domain resource is the sixth offset set.

Step 602: The terminal device receives the first information from the network device, and the terminal device sends the SRS based on the first information.

For example, the terminal device sends the SRS in the frequency hopping manner on the plurality of frequency hopping subbands.

For example, the SRS configured bandwidth includes L frequency hopping subbands, the terminal device sends the SRS at L transmission opportunities on a corresponding frequency hopping subband in one frequency hopping period, and L is a positive integer.

The following describes this embodiment of this application with reference to specific examples.

If a minimum transmission granularity (Partial SRS, PSG) includes one or more RBs. SRS_BW_MAX is a maximum transmission bandwidth (namely. a frequency hopping subband) for one SRS transmission, where K=SRS_BW_MAX/PSG. If K is equal to 4, there may be the following six SRS transmission patterns (namely, frequency hopping manners). The network device can indicate the SRS transmission pattern by using 3 bits. T is one frequency hopping period.

Pattern 1: Each frequency hopping subband is divided into four resources, and the four resources are respectively identified as 1, 2, 3, and 4 (for example, PSG #1, PSG #2, PSG #3, and PSG #4). The SRS is transmitted on one PSG resource each time. PSG identifiers of each SRS transmission in each frequency hopping period are the same. In different frequency hopping periods, the SRS is sent in a sequence of resources PSG #1, PSG #3, PSG #2, and PSG #4 in each SRS transmission, as shown in FIG. 7.

Pattern 2: Each frequency hopping subband is divided into four resources, and the four resources are respectively identified as 1, 2, 3, and 4 (for example, PSG #1, PSG #2, PSG #3, and PSG #4). The SRS is transmitted on one PSG resource each time. PSG identifiers of each SRS transmission in each frequency hopping period are the same. In different frequency hopping periods, the SRS is sent in a sequence of resources PSG #2, PSG #4, PSG #1, and PSG #3 in each SRS transmission, as shown in FIG. 8.

Pattern 3: Each frequency hopping subband is divided into four resources, and the four resources are respectively identified as 1, 2, 3, and 4 (for example, PSG #1, PSG #2, PSG #3, and PSG #4). The SRS is transmitted on one PSG resource each time. PSG identifiers of each SRS transmission in each frequency hopping period are the same. In different frequency hopping periods, the SRS is sent in a sequence of resources PSG #3, PSG #2, PSG #4, and PSG #1 in each SRS transmission, as shown in FIG. 9.

Pattern 4: Each frequency hopping subband is divided into four resources, and the four resources are respectively identified as 1, 2, 3, and 4 (for example, PSG #1, PSG #2, PSG #3, and PSG #4). The SRS is transmitted on one PSG resource each time. PSG identifiers of each SRS transmission in each frequency hopping period are the same. In different frequency hopping periods, the SRS is sent in a sequence of resources PSG #4, PSG #1, PSG #3, and PSG #2 in each SRS transmission, as shown in FIG. 10.

Pattern 5: Each frequency hopping subband is divided into four resources, and the four resources are respectively identified as 1, 2, 3, and 4 (for example, PSG #1, PSG #2, PSG #3, and PSG #4). The SRS is transmitted on two consecutive PSG resources each time. PSG identifiers of each SRS transmission in each frequency hopping period are the same. In different frequency hopping periods, the SRS is sent in a sequence of resources PSG #1+PSG #2, and PSG #3+PSG #4 in each SRS transmission, as shown in FIG. 11.

Pattern 6: Each frequency hopping subband is divided into four resources, and the four resources are respectively identified as 1, 2, 3, and 4 (for example, PSG #1, PSG #2, PSG #3, and PSG #4). The SRS is transmitted on two consecutive PSG resources each time. PSG identifiers of each SRS transmission in each frequency hopping period are the same. In different frequency hopping periods, the SRS is sent in a sequence of resources PSG #3+PSG #4, and PSG #1+PSG #2 in each SRS transmission, as shown in FIG. 12.

Further, the network device can configure different SRS transmission patterns (namely, the frequency hopping manners) for different terminal devices, to implement multi-user multiplexing. The following examples describe how to configure an SRS transmission pattern of a bandwidth part when multiplexing is performed between different users.

Example 1: The pattern 1, the pattern 2, the pattern 3, and the pattern 4 can be respectively allocated to four users, to implement multiplexing of the four users, or any two of four patterns can be respectively allocated to two users, to implement multiplexing of the two users, or any three of four patterns can be respectively allocated to three users, to implement multiplexing of the three users.

Example 2: The pattern 3, the pattern 4, and the pattern 5 can be respectively allocated to three users to implement multiplexing of the three users, or the pattern 3 and the pattern 5 can be respectively allocated to two users to implement multiplexing of the two users, or the pattern 4 and the pattern 5 can be respectively allocated to two users, to implement multiplexing of the two users.

Example 3: The pattern 3, the pattern 4, and the pattern 5 can be respectively allocated to three users, to implement multiplexing of the three users, or the pattern 3 and the pattern 5 can be respectively allocated to two users, to implement multiplexing of the two users, or the pattern 4 and the pattern 5 can be respectively allocated to two users, to implement multiplexing of the two users.

Example 4: The pattern 1, the pattern 2, and the pattern 6 can be respectively allocated to three users, to implement multiplexing of the three users, or the pattern 1 and the pattern 6 can be respectively allocated to two users, to implement multiplexing of the two users. or the pattern 2 and the pattern 6 can be respectively allocated to two users, to implement multiplexing of the two users.

Example 5: The pattern 5 and the pattern 6 can be respectively allocated to two users, to implement multiplexing of the two users.

It can be ensured that channel estimation performance on each frequency hopping subband is average by using an SRS sending method of the bandwidth part provided in this embodiment of this application, to improve system performance.

It can be understood that, to implement functions in the foregoing embodiment, the network device and the terminal device include corresponding hardware structures and/or software modules for performing the functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on a particular application scenario and design constraint of the technical solutions.

Figure 13:
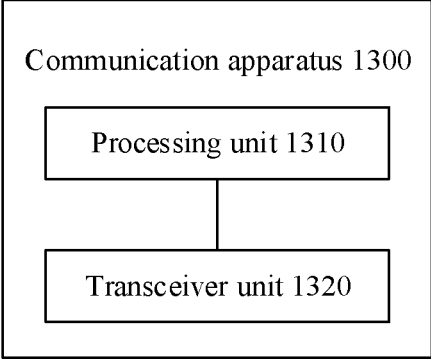
FIG. 13 is a schematic diagram 1 of a structure of a communication apparatus according to an embodiment of this application.
Figure 14:
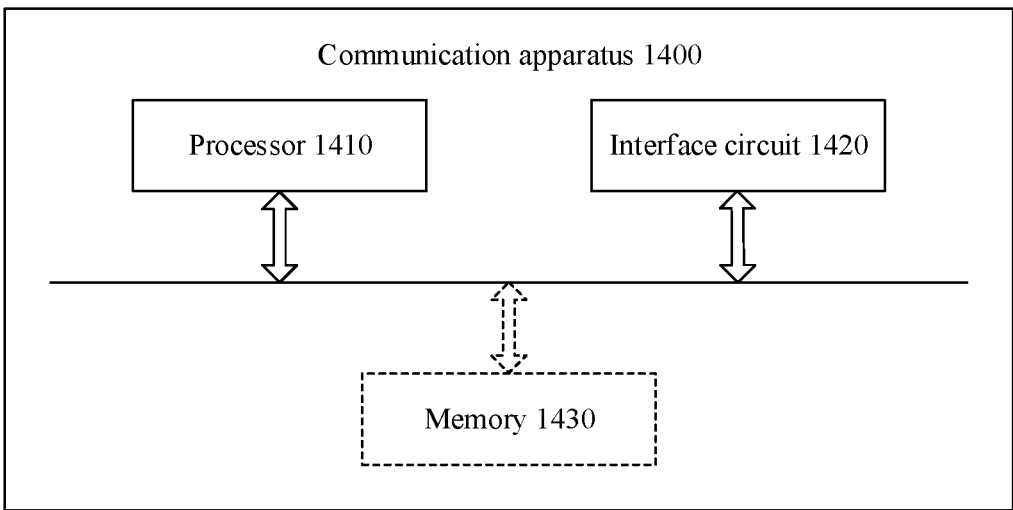
FIG. 14 is a schematic diagram 2 of a structure of a communication apparatus according to an embodiment of this application.

FIG. 13 and FIG. 14 are schematic diagrams of structures of a possible communication apparatus according to an embodiment of this application. The communication apparatus may be configured to implement functions of the terminal device or the network device in the foregoing method embodiments. Therefore, beneficial effect of the foregoing method embodiments can also be implemented. In this embodiment of this application, the communication apparatus may be a terminal device, or may be a network device, or may be a module (for example, a chip) applied to a terminal device or a network device.

As shown in FIG. 13, a communication apparatus 1300 includes a processing unit 1310, and a transceiver unit 1320. The communication apparatus 1300 is configured to implement a function of the terminal device or the network device in the method embodiment shown in FIG. 6.

When the communication apparatus 1300 is configured to implement the function of the terminal device in the method embodiment shown in FIG. 6, the processing unit 1310 invokes the transceiver unit 1320 to:

receive first information, where the first information indicates a sounding reference signal SRS frequency domain resource, the SRS frequency domain resource includes a first frequency domain unit and a second frequency domain unit, the first frequency domain unit is different from the second frequency domain unit, the first frequency domain unit is a frequency domain resource occupied by an SRS on a first frequency hopping subband in a first frequency hopping period, the second frequency domain unit is a frequency domain resource occupied by the SRS on the first frequency hopping subband in a second frequency hopping period, and the first frequency hopping subband is one of a plurality of frequency hopping subbands; and send the SRS based on the first information.

When the communication apparatus 1300 is configured to implement the function of the network device in the method embodiment shown in FIG. 6, the processing unit invokes the transceiver unit to:

send the first information to the terminal device, where the first information indicates the SRS frequency domain resource, the SRS frequency domain resource includes the first frequency domain unit and the second frequency domain unit, the first frequency domain unit is different from the second frequency domain unit, the first frequency domain unit is the frequency domain resource occupied by the SRS on the first frequency hopping subband in the first frequency hopping period, the second frequency domain unit is the frequency domain resource occupied by the SRS on the first frequency hopping subband in the second frequency hopping period, and the first frequency hopping subband is one of the plurality of frequency hopping subbands; and receive the SRS from the terminal device based on the first information.

For more detailed descriptions about the processing unit 1310 and the transceiver unit 1320, refer to related descriptions in the foregoing method embodiment. Details are not described herein again.

As shown in FIG. 14, a communication apparatus 1400 includes a processor 1410 and an interface circuit 1420. The processor 1410 and the interface circuit 1420 are coupled to each other. It may be understood that the interface circuit 1420 may be a transceiver or an input/output interface. Optionally, the communication apparatus 1400 may further include a memory 1430, configured to: store instructions to be executed by the processor 1410, store input data required for running instructions by the processor 1410, or store data generated after the processor 1410 runs instructions.

When the communication apparatus 1400 is configured to implement the method shown in FIG. 6, the processor 1410 is configured to implement a function of the processing unit 1310, and the interface circuit 1420 is configured to implement a function of the transceiver unit 1320.

When the communication apparatus is a chip applied to a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It can be understood that, the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor or the like.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in the network device or the terminal device. Certainly, the processor and the storage medium may exist in the network device or the terminal device as discrete components.

All or some of the foregoing embodiments may be implemented by using software, hardware, firmware, or any combination thereof. When the software is used to implement embodiments, all or some of embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a special-purpose computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

Embodiments of this application provide a communication system. The communication system includes a network device and at least one terminal device. The network device is configured to implement functions of the network device in the foregoing embodiments, and the terminal device is configured to implement functions of the terminal device in the foregoing embodiments.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. In this application, "and/or" is an association relationship describing associated objects, and indicates that three relationships may exist. For example, A and/or B may indicate that only A exists, both A and B exist, and only B exists. A and B each may be singular or plural. In the text descriptions of this application, the character "/" generally indicates an "or" relationship between the associated objects. In a formula in this application, the character "I" indicates a "division" relationship between the associated objects.

It may be understood that, various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. A communication method applied to a communication apparatus, the method comprising:
   receiving first information that indicates a sounding reference signal (SRS) frequency domain resource comprising a first frequency domain unit, a second frequency domain unit, and a third frequency domain unit, wherein the first frequency domain unit is different from the second frequency domain unit, wherein the first frequency domain unit is a frequency domain resource occupied by an SRS on a first frequency hopping subband in a first frequency hopping period, wherein the second frequency domain unit is a frequency domain resource occupied by the SRS on the first frequency hopping subband in a second frequency hopping period, wherein the first frequency hopping subband is one of a plurality of frequency hopping subbands, wherein the third frequency domain unit is a frequency domain resource occupied by the SRS on a second frequency hopping subband in the first frequency hopping period, wherein the second frequency hopping subband is one of the plurality of frequency hopping subbands and is different from the first frequency hopping subband, and wherein a frequency domain offset of a starting position of the first frequency domain unit relative to a starting position of the first frequency hopping subband is the same as a frequency domain offset of a starting position of the third frequency domain unit relative to a starting position of the second frequency hopping subband; and sending the SRS based on the first information.

2. The method according to claim 1, wherein the first frequency domain unit is less than a frequency domain resource occupied by the first frequency hopping subband.

3. The method according to claim 1, wherein the frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units, wherein a frequency domain width occupied by the N frequency domain units is less than a bandwidth of the first frequency hopping subband, and wherein N is a positive integer.

4. The method according to claim 1, wherein the first frequency hopping subband comprises a frequency domain unit 1, a frequency domain unit 2, a frequency domain unit 3, and a frequency domain unit 4 in a frequency domain sequence; and in four consecutive frequency hopping periods, an SRS frequency domain resource occupation manner on the first frequency hopping subband is any one of the following:

the four consecutive frequency hopping periods successively occupy the frequency domain unit 1, the frequency domain unit 3, the frequency domain unit 2, and the frequency domain unit 4;

the four consecutive frequency hopping periods successively occupy the frequency domain unit 2, the frequency domain unit 4, the frequency domain unit 1, and the frequency domain unit 3;

the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

5. A communication method applied to a communication apparatus, the method comprising:

sending first information that indicates a sounding reference signal (SRS) frequency domain resource that comprises a first frequency domain unit, a second frequency domain unit and a third frequency domain unit, wherein the first frequency domain unit is different from the second frequency domain unit, wherein the first frequency domain unit is a frequency domain resource occupied by an SRS on a first frequency hopping subband in a first frequency hopping period, wherein the second frequency domain unit is a frequency domain resource occupied by the SRS on the first frequency hopping subband in a second frequency hopping period, wherein the first frequency hopping subband is one of a plurality of frequency hopping subbands, wherein the third frequency domain unit is a frequency domain resource occupied by the SRS on a second frequency hopping subband in the first frequency hopping period, wherein the second frequency hopping subband is one of the plurality of frequency hopping subbands and is different from the first frequency hopping subband, and wherein a frequency domain offset of a starting position of the first frequency domain unit relative to a starting position of the first frequency hopping subband is the same as a frequency domain offset of a starting position of the third frequency domain unit relative to a starting position of the second frequency hopping subband; and receiving the SRS based on the first information.

6. The method according to claim 5, wherein the first frequency domain unit is less than a frequency domain resource occupied by the first frequency hopping subband.

7. The method according to claim 5, wherein the frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units, wherein a frequency domain width occupied by the N frequency domain units is less than a bandwidth of the first frequency hopping subband, and wherein N is a positive integer.

8. The method according to claim 5, wherein the first frequency hopping subband comprises a frequency domain unit 1, a frequency domain unit 2, a frequency domain unit 3, and a frequency domain unit 4 in a frequency domain sequence; and in four consecutive frequency hopping periods, an SRS frequency domain resource occupation manner on the first frequency hopping subband is any one of the following:

the four consecutive frequency hopping periods successively occupy the frequency domain unit 1, the frequency domain unit 3, the frequency domain unit 2, and the frequency domain unit 4;

the four consecutive frequency hopping periods successively occupy the frequency domain unit 2, the frequency domain unit 4, the frequency domain unit 1, and the frequency domain unit 3;

the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

9. A communication apparatus comprising at least one processor configured to execute programming instructions to enable the communication apparatus to implement operations comprising:

receiving first information that indicates a sounding reference signal (SRS) frequency domain resource comprising a first frequency domain unit, a second frequency domain unit and a third frequency domain unit, wherein the first frequency domain unit is different from the second frequency domain unit, wherein the first frequency domain unit is a frequency domain resource occupied by an SRS on a first frequency hopping subband in a first frequency hopping period, wherein the second frequency domain unit is a frequency domain resource occupied by the SRS on the first frequency hopping subband in a second frequency hopping period, wherein the first frequency hopping subband is one of a plurality of frequency hopping subbands, wherein the third frequency domain unit is a frequency domain resource occupied by the SRS on a second frequency hopping subband in the first frequency hopping period, wherein the second frequency hopping subband is one of the plurality of frequency hopping subbands and is different from the first frequency hopping subband, and wherein a frequency domain offset of a starting position of the first frequency domain unit relative to a starting position of the first frequency hopping subband is the same as a frequency domain offset of a starting position of the third frequency domain unit relative to a starting position of the second frequency hopping subband; and sending the SRS based on the first information.

10. The apparatus according to claim 9, wherein the first frequency domain unit is less than a frequency domain resource occupied by the first frequency hopping subband.

11. The apparatus according to claim 9, wherein the frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units, wherein a frequency domain width occupied by the N frequency domain units is less than a bandwidth of the first frequency hopping subband, and wherein N is a positive integer.

12. The apparatus according to claim 9, wherein the first frequency hopping subband comprises a frequency domain unit 1, a frequency domain unit 2, a frequency domain unit 3, and a frequency domain unit 4 in a frequency domain sequence; and in four consecutive frequency hopping periods, an SRS frequency domain resource occupation manner on the first frequency hopping subband is any one of the following:

the four consecutive frequency hopping periods successively occupy the frequency domain unit 1, the frequency domain unit 3, the frequency domain unit 2, and the frequency domain unit 4;

the four consecutive frequency hopping periods successively occupy the frequency domain unit 2, the frequency domain unit 4, the frequency domain unit 1, and the frequency domain unit 3;

the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

13. A communication apparatus comprises at least one processor configured to execute programming instructions to enable the communication apparatus to implement operations comprising:

sending first information that indicates a sounding reference signal (SRS) frequency domain resource that comprises a first frequency domain unit, a second frequency domain unit and a third frequency domain unit, wherein the first frequency domain unit is different from the second frequency domain unit, the first frequency domain unit is a frequency domain resource occupied by an SRS on a first frequency hopping subband in a first frequency hopping period, wherein the second frequency domain unit is a frequency domain resource occupied by the SRS on the first frequency hopping subband in a second frequency hopping period, wherein the first frequency hopping subband is one of a plurality of frequency hopping subbands, wherein the third frequency domain unit is a frequency domain resource occupied by the SRS on a second frequency hopping subband in the first frequency hopping period, wherein the second frequency hopping subband is one of the plurality of frequency hopping subbands and is different from the first frequency hopping subband, and wherein a frequency domain offset of a starting position of the first frequency domain unit relative to a starting position of the first frequency hopping subband is the same as a frequency domain offset of a starting position of the third frequency domain unit relative to a starting position of the second frequency hopping subband; and receiving the SRS from a terminal device based on the first information.

14. The apparatus according to claim 13, wherein the first frequency domain unit is less than a frequency domain resource occupied by the first frequency hopping subband.

15. The apparatus according to claim 13, wherein the frequency domain offset of the starting position of the first frequency domain unit relative to the starting position of the first frequency hopping subband differs from a frequency domain offset of a starting position of the second frequency domain unit relative to the starting position of the first frequency hopping subband by N frequency domain units, wherein a frequency domain width occupied by the N frequency domain units is less than a bandwidth of the first frequency hopping subband, and wherein N is a positive integer.

16. The apparatus according to claim 13, wherein the first frequency hopping subband comprises a frequency domain unit 1, a frequency domain unit 2, a frequency domain unit 3, and a frequency domain unit 4 in a frequency domain sequence; and in four consecutive frequency hopping periods, an SRS frequency domain resource occupation manner on the first frequency hopping subband is any one of the following:

the four consecutive frequency hopping periods successively occupy the frequency domain unit 1, the frequency domain unit 3, the frequency domain unit 2, and the frequency domain unit 4;

the four consecutive frequency hopping periods successively occupy the frequency domain unit 2, the frequency domain unit 4, the frequency domain unit 1, and the frequency domain unit 3;

the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

17. A non-transitory computer-readable storage medium that stores a computer program or instructions that, when executed by a communications apparatus, cause the communications apparatus to:

receive first information that indicates a sounding reference signal (SRS) frequency domain resource that comprises a first frequency domain unit, a second frequency domain unit and a third frequency domain unit, wherein the first frequency domain unit is different from the second frequency domain unit, wherein the first frequency domain unit is a frequency domain resource occupied by an SRS on a first frequency hopping subband in a first frequency hopping period, wherein the second frequency domain unit is a frequency domain resource occupied by the SRS on the first frequency hopping subband in a second frequency hopping period, wherein the first frequency hopping subband is one of a plurality of frequency hopping subbands, wherein the third frequency domain unit is a frequency domain resource occupied by the SRS on a second frequency hopping subband in the first frequency hopping period, wherein the second frequency hopping subband is one of the plurality of frequency hopping subbands and is different from the first frequency hopping subband, and wherein a frequency domain offset of a starting position of the first frequency domain unit relative to a starting position of the first frequency hopping subband is the same as a frequency domain offset of a starting position of the third frequency domain unit relative to a starting position of the second frequency hopping subband; and send the SRS based on the first information.

18. The non-transitory computer-readable storage medium according to claim 17, wherein the first frequency hopping subband comprises a frequency domain unit 1, a frequency domain unit 2, a frequency domain unit 3, and a frequency domain unit 4 in a frequency domain sequence; and in four consecutive frequency hopping periods, an SRS frequency domain resource occupation manner on the first frequency hopping subband is any one of the following:

the four consecutive frequency hopping periods successively occupy the frequency domain unit 1, the frequency domain unit 3, the frequency domain unit 2, and the frequency domain unit 4;

the four consecutive frequency hopping periods successively occupy the frequency domain unit 2, the frequency domain unit 4, the frequency domain unit 1, and the frequency domain unit 3;

the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

19. A non-transitory computer-readable storage medium that stores a computer program or instructions that, when executed by a communications apparatus, cause the communications apparatus to:

send first information that indicates a sounding reference signal (SRS) frequency domain resource that comprises a first frequency domain unit, a second frequency domain unit and a third frequency domain unit, wherein the first frequency domain unit is different from the second frequency domain unit, wherein the first frequency domain unit is a frequency domain resource occupied by an SRS on a first frequency hopping subband in a first frequency hopping period, wherein the second frequency domain unit is a frequency domain resource occupied by the SRS on the first frequency hopping subband in a second frequency hopping period, wherein the first frequency hopping subband is one of a plurality of frequency hopping subbands, wherein the third frequency domain unit is a frequency domain resource occupied by the SRS on a second frequency hopping subband in the first frequency hopping period, wherein the second frequency hopping subband is one of the plurality of frequency hopping subbands and is different from the first frequency hopping subband, and wherein a frequency domain offset of a starting position of the first frequency domain unit relative to a starting position of the first frequency hopping subband is the same as a frequency domain offset of a starting position of the third frequency domain unit relative to a starting position of the second frequency hopping subband; and receive the SRS based on the first information.

20. The non-transitory computer-readable storage medium according to claim 19, wherein the first frequency hopping subband comprises a frequency domain unit 1, a frequency domain unit 2, a frequency domain unit 3, and a frequency domain unit 4 in a frequency domain sequence; and in four consecutive frequency hopping periods, an SRS frequency domain resource occupation manner on the first frequency hopping subband is any one of the following:

the four consecutive frequency hopping periods successively occupy the frequency domain unit 1, the frequency domain unit 3, the frequency domain unit 2, and the frequency domain unit 4;

the four consecutive frequency hopping periods successively occupy the frequency domain unit 2, the frequency domain unit 4, the frequency domain unit 1, and the frequency domain unit 3;

the four consecutive frequency hopping periods successively occupy the frequency domain unit 3, the frequency domain unit 2, the frequency domain unit 4, and the frequency domain unit 1; and the four consecutive frequency hopping periods successively occupy the frequency domain unit 4, the frequency domain unit 1, the frequency domain unit 3, and the frequency domain unit 2.

\* \* \* \* \*